(12) United States Patent
Maruhashi

(10) Patent No.: US 9,778,729 B2
(45) Date of Patent: Oct. 3, 2017

(54) INFORMATION PROCESSING APPARATUS, METHOD OF CONTROLLING THE SAME, AND STORAGE MEDIUM FOR DETERMINING COMMUNICATION RATE

(71) Applicant: CANON KABUSHIKI KAISHA, Tokyo (JP)

(72) Inventor: Kazuaki Maruhashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 14/643,649

(22) Filed: Mar. 10, 2015

(65) Prior Publication Data

US 2015/0261288 A1 Sep. 17, 2015

(30) Foreign Application Priority Data

Mar. 14, 2014 (JP) ................. 2014-052429

(51) Int. Cl.
*G06F 1/32* (2006.01)
*G06F 13/38* (2006.01)
*G06K 15/00* (2006.01)

(52) U.S. Cl.
CPC .......... *G06F 1/3287* (2013.01); *G06F 1/3278* (2013.01); *G06F 1/3284* (2013.01); *G06F 13/385* (2013.01); *G06K 15/4055* (2013.01); *G06F 1/3228* (2013.01); *Y02B 60/126* (2013.01); *Y02B 60/1235* (2013.01); *Y02B 60/1267* (2013.01); *Y02B 60/32* (2013.01); *Y02B 60/35* (2013.01); *Y02B 60/44* (2013.01)

(58) Field of Classification Search
None
See application file for complete search history.

(56) References Cited

U.S. PATENT DOCUMENTS 7,716,506 B1 * 5/2010 Surgutchik ............ G06F 1/3203
713/321
8,977,877 B2 3/2015 Yamada et al. ......... H04L 12/12
(Continued)

FOREIGN PATENT DOCUMENTS

CN 102904671 A 1/2013
JP 2013-027991 A 2/2013
(Continued)

OTHER PUBLICATIONS

EP Application No. 15158822.5-1954—EP Search Report dated Aug. 6, 2015.
(Continued)

*Primary Examiner* — Nicholas Pachol
(74) *Attorney, Agent, or Firm* — Fitzpatrick, Cella, Harper & Scinto

(57) ABSTRACT

An EEE function when an electricity saving function is enabled and a PHY communication rate setting method need to be taken into consideration. In relation to communication with an external apparatus by a communication unit, an information processing apparatus determines whether a power saving function of realizing power saving of the communication unit by stopping some of functions of the communication unit while establishing a link is enabled. In accordance with the result of the determination, a communication rate when the information processing apparatus operates in a power saving mode is decided.

5 Claims, 15 Drawing Sheets

(56) References Cited

U.S. PATENT DOCUMENTS

| | | | | |
|---|---|---|---|---|
| 2009/0125739 A1* | 5/2009 | Satoh | G06F 1/3287 | 713/322 |
| 2009/0300392 A1* | 12/2009 | Henderson | G06F 1/3203 | 713/323 |
| 2010/0293404 A1* | 11/2010 | Diab | G06F 1/3209 | 713/324 |
| 2010/0325463 A1* | 12/2010 | Lindsay | G06F 1/3209 | 713/330 |
| 2011/0191568 A1* | 8/2011 | Yamamoto | G06F 1/3203 | 712/30 |
| 2011/0276814 A1* | 11/2011 | Kamijima | G06F 1/3203 | 713/320 |
| 2012/0069387 A1* | 3/2012 | Siddle | G06F 1/3284 | 358/1.15 |
| 2012/0284550 A1* | 11/2012 | Park | H04N 1/00885 | 713/323 |
| 2012/0287467 A1* | 11/2012 | Yamano | G06F 1/3209 | 358/1.15 |
| 2012/0287829 A1* | 11/2012 | Chang | H04L 5/16 | 370/296 |
| 2013/0031395 A1* | 1/2013 | Yamada | H04L 12/12 | 713/323 |
| 2013/0063756 A1* | 3/2013 | Gray | G06F 1/3284 | 358/1.14 |
| 2013/0088749 A1* | 4/2013 | Park | H04L 12/12 | 358/1.15 |
| 2013/0145191 A1 | 6/2013 | Hung | | 713/323 |
| 2013/0163616 A1* | 6/2013 | Niitsuma | H04L 12/12 | 370/468 |
| 2014/0009780 A1* | 1/2014 | Hamachi | G06F 3/1221 | 358/1.14 |
| 2014/0043954 A1* | 2/2014 | Wang | H04B 3/32 | 370/201 |
| 2014/0047249 A1* | 2/2014 | Koga | G06F 1/3206 | 713/310 |
| 2014/0126444 A1* | 5/2014 | Tseng | G06F 1/3209 | 370/311 |
| 2015/0134986 A1* | 5/2015 | Hasui | G06F 1/3209 | 713/320 |

FOREIGN PATENT DOCUMENTS

| | | | | |
|---|---|---|---|---|
| TW | 201324175 A | 6/2013 | | |
| WO | 2013/131231 A1 | 9/2013 | | H04L 12/56 |

OTHER PUBLICATIONS

Chinese Office Action issued in corresponding Chinese Application No. 201510111725.2 dated May 31, 2017.

* cited by examiner

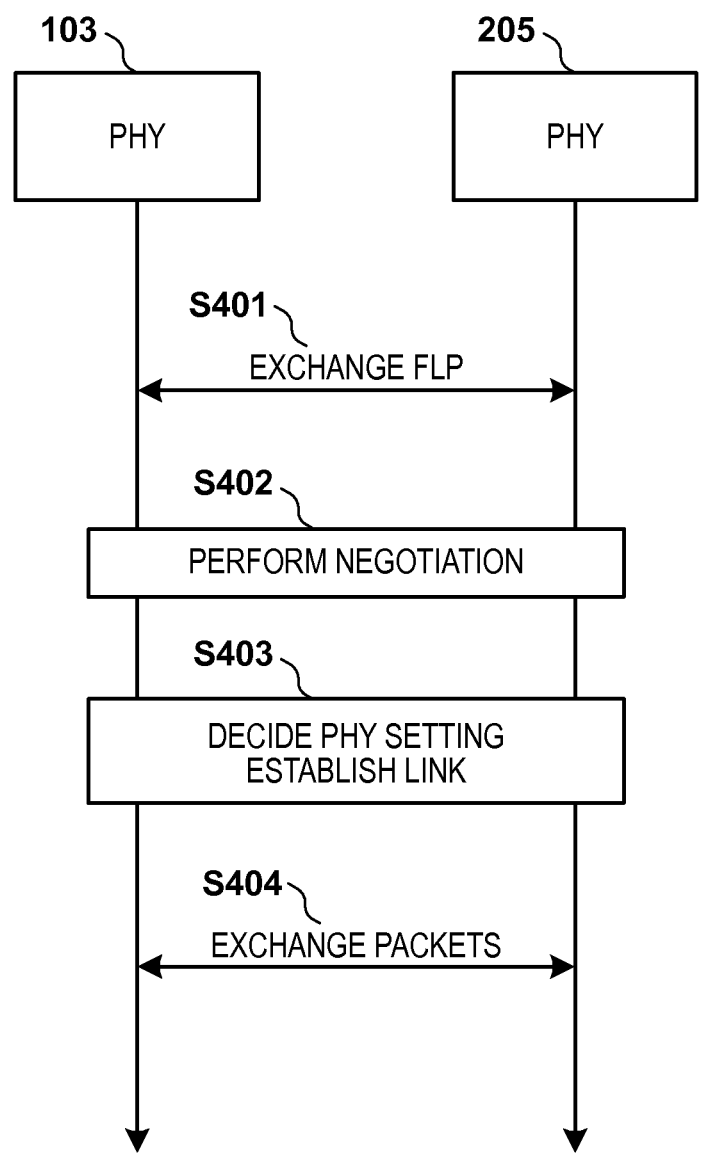

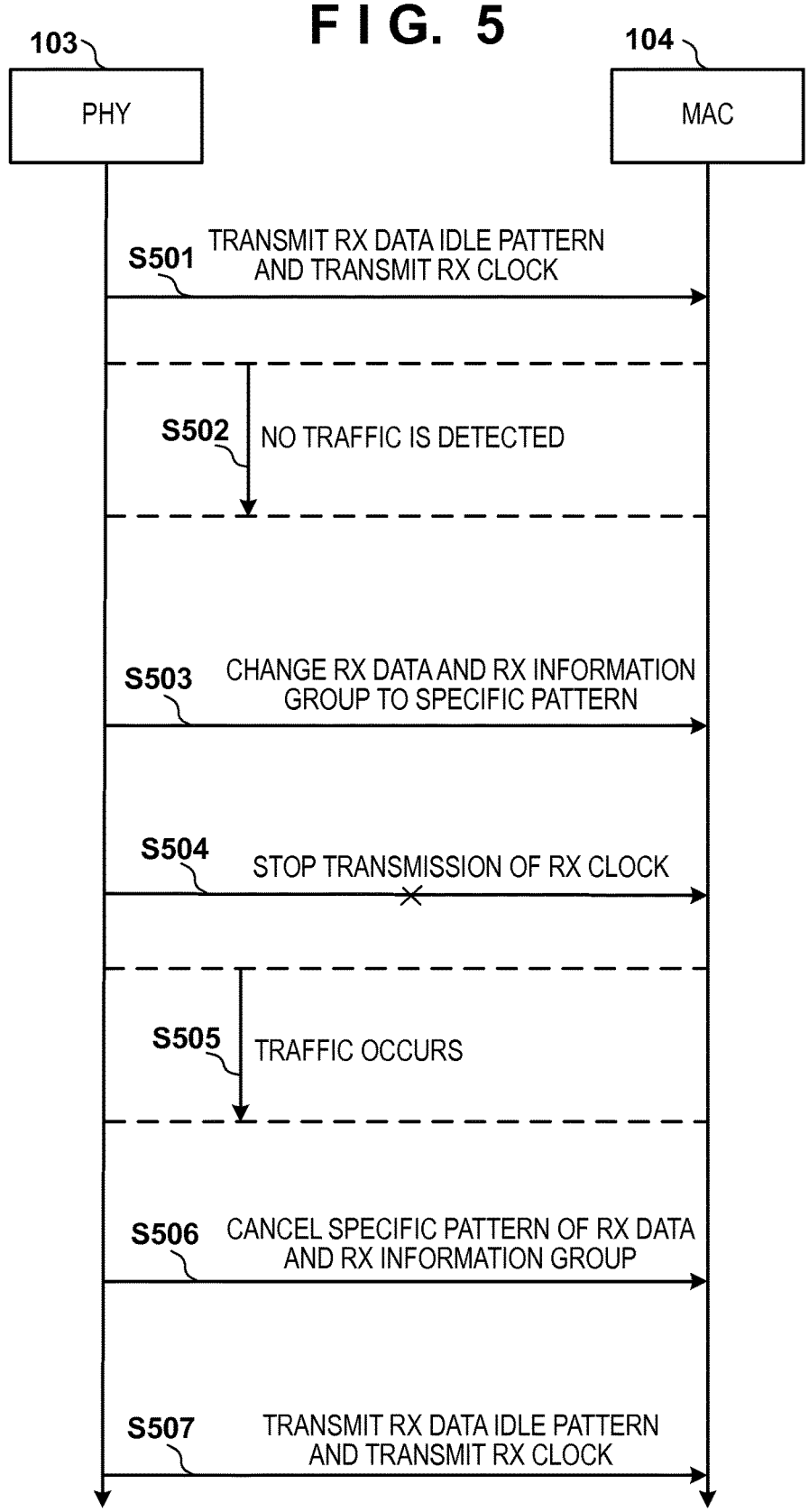

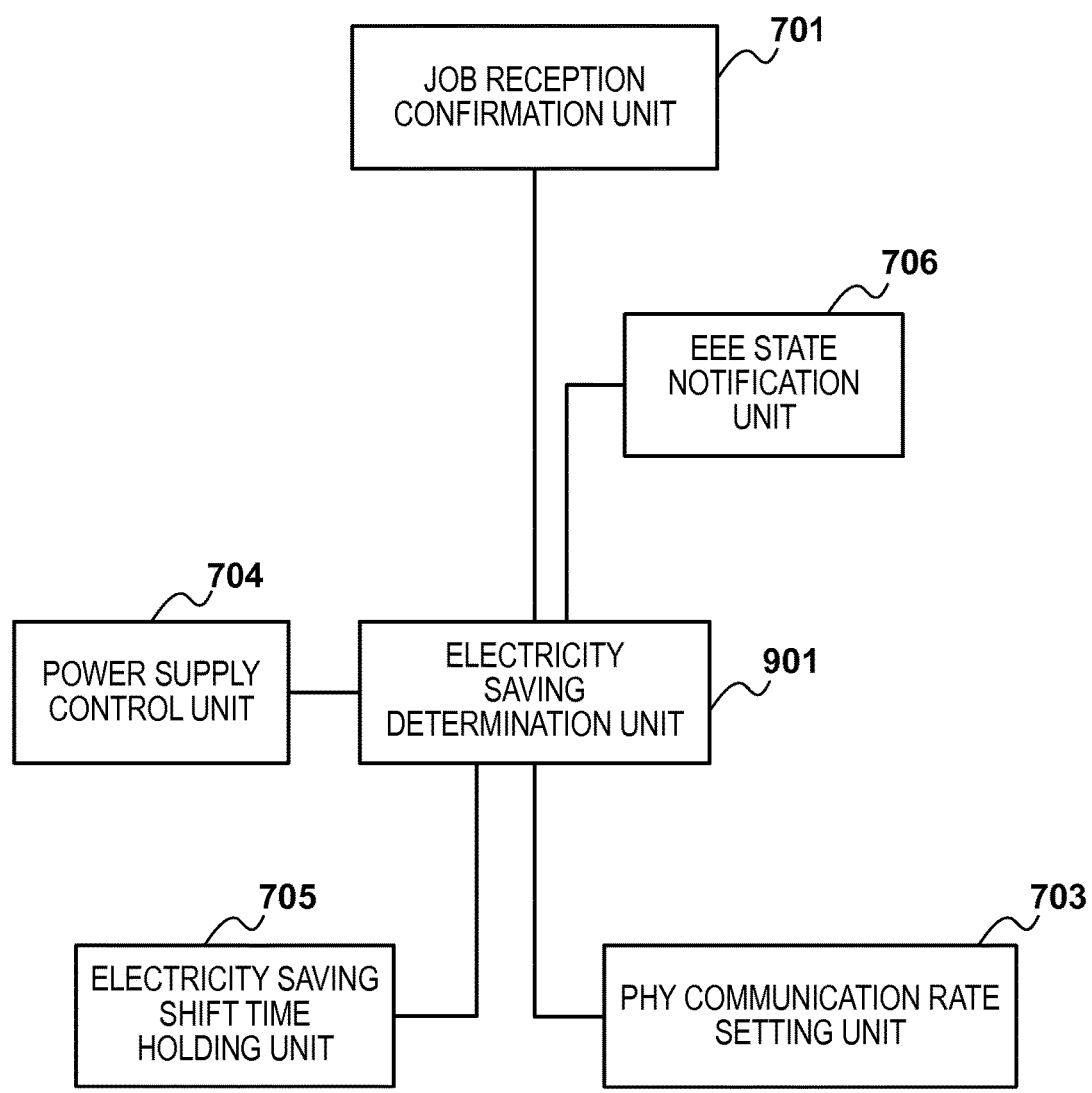
F I G. 9

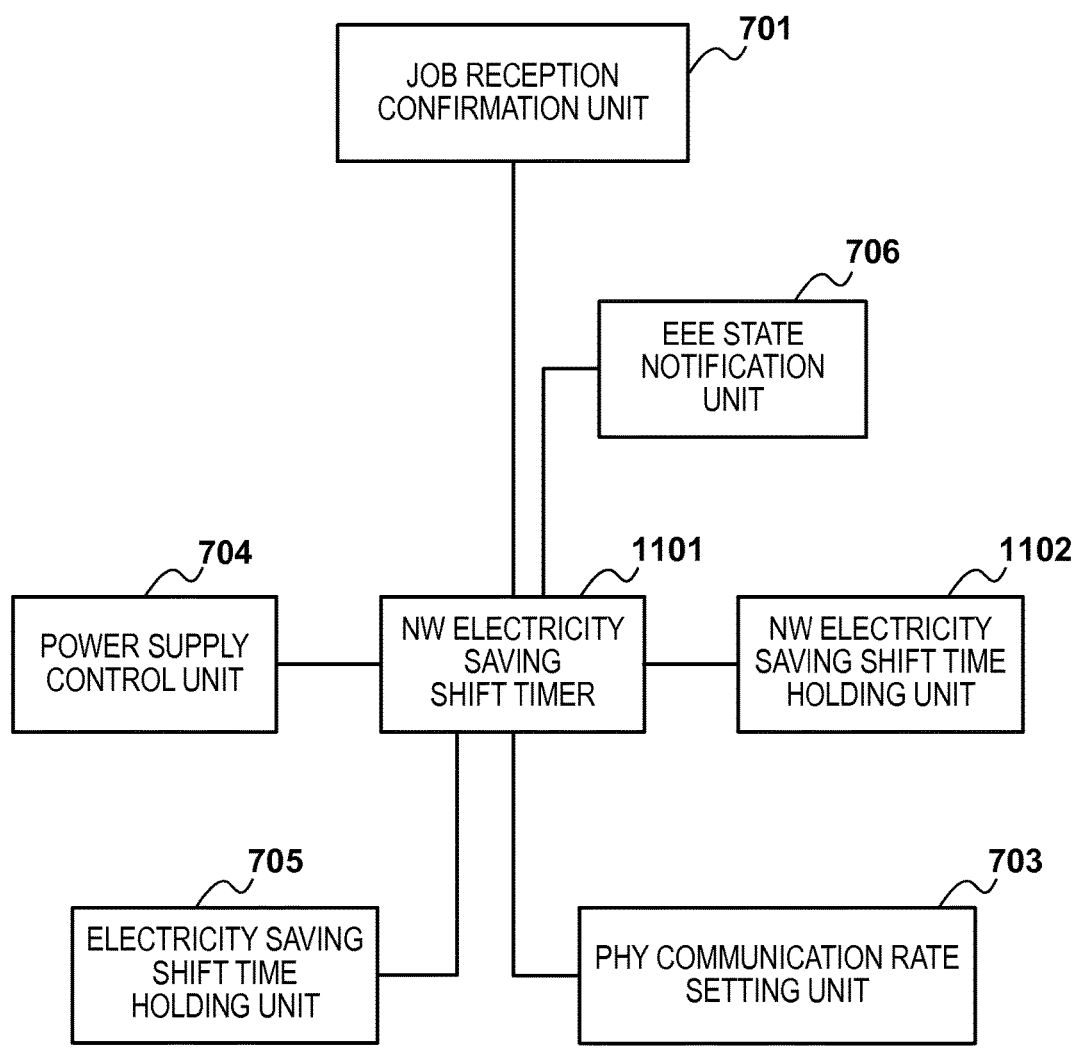
F I G. 11

INFORMATION PROCESSING APPARATUS, METHOD OF CONTROLLING THE SAME, AND STORAGE MEDIUM FOR DETERMINING COMMUNICATION RATE

BACKGROUND OF THE INVENTION

Field of the Invention

The present invention relates to an information processing apparatus, a method of controlling the same, and a storage medium.

Description of the Related Art

In an information processing apparatus connectable to a LAN network (Local Area Network), such as a printer, scanner, facsimile apparatus, or multi-functional peripheral, the communication rate is increasing as the amount of data to be processed increases. A maximum communication rate set in a PHY (Physical Layer) as a physical layer of a LAN interface is represented by a physically transmittable maximum bit rate per unit time such as 1,000, 100, and 10 Mbps. As the maximum communication rate of an apparatus including a LAN interface thus increases, the power consumption of the PHY also increases. Since demands for energy saving are increasing in recent years, demands have arisen for a high communication rate and low power consumption of a network.

To realize power saving of an information processing apparatus, apparatuses having an electricity saving function which partially stops internal power supply or temporarily stops functions when neither access nor an operation has been performed for a predetermined time are spreading. It is also possible to decrease the communication rate of the PHY to a minimum rate at the timing at which this electricity saving state begins, and perform linking again, thereby reducing the power of the PHY while using a network. In this case, however, the communication rate of the PHY is changed, so the link is disconnected, and packet dropping may occur during the disconnection.

As a method of realizing power saving without disconnecting a link while maintaining the highest communication rate of the PHY, there is a method which uses a PHY having an EEE (Energy Efficient Ethernet) function. The EEE is a standard formulated by IEEE802.3az, and is a technique which realizes power reduction of a network while establishing a link of the PHY when there is no network traffic for a predetermined time. This EEE includes a method of realizing power reduction by stopping some functions of the PHY and a MAC as an upper layer of the PHY in accordance with a network traffic. This method is called an LPI (Low Power Idle).

Japanese Patent Laid-Open No. 2013-027991 has proposed a method of enhancing the electricity saving effect of an information processing apparatus by using the LPI. This method stops, when the EEE is enabled, an image processing clock in an apparatus in addition to a communication clock, if conditions for shifting to the LPI are satisfied, or if no image formation data has been received from a network for a predetermined time.

Unfortunately, Japanese Patent Laid-Open No. 2013-027991 does not take account of the EEE function and a method of setting of the communication rate of the PHY when the above-mentioned power saving function is enabled.

SUMMARY OF THE INVENTION

To solve the problem of the above-mentioned related art, the present invention provides a technique which sets the communication rate of the PHY in accordance with the utilization state of the EEE function, thereby maximizing the performance of a network while enhancing the electricity saving effect of an information processing apparatus.

According to one aspect of the present invention, there is provided an information processing apparatus comprising: a communicating unit configured to execute communication with an external apparatus; a determining unit configured to determine, in relation to the communication with the external apparatus, whether a power saving function of realizing power saving of the communicating unit by stopping some of functions of the communicating unit while establishing a link is enabled; and a deciding unit configured to decide a communication rate when the information processing apparatus operates in a power saving mode, in accordance with a result of the determination by the determining unit.

According to another aspect of the present invention, there is provided a method of controlling an information processing apparatus which comprises communicating unit configured to execute communication with an external apparatus, the method comprising steps of: determining, in relation to the communication with the external apparatus, whether a power saving function of realizing power saving of the communicating unit by stopping some of functions of the communicating unit while establishing a link is enabled; and deciding a communication rate when the information processing apparatus operates in a power saving mode, in accordance with a result of the determination in the determining step.

According to still another aspect of the present invention, there is provided a non-transitory computer-readable storage medium storing a program for causing a computer to execute steps of a method of controlling an information processing apparatus which comprises communicating unit configured to execute communication with an external apparatus, the method comprising steps of: determining, in relation to the communication with the external apparatus, whether a power saving function of realizing power saving of the communicating unit by stopping some of functions of the communicating unit while establishing a link is enabled; and deciding a communication rate when the information processing apparatus operates in a power saving mode, in accordance with a result of the determination in the determining step.

The present invention makes it possible to effectively utilize the performance of a network while performing optimum electricity saving control on an information processing apparatus, by using the electricity saving function of the information processing apparatus and the electricity saving effect of the EEE.

Further features of the present invention will become apparent from the following description of exemplary embodiments (with reference to the attached drawings).

BRIEF DESCRIPTION OF THE DRAWINGS

FIG. 4 is a sequence chart for explaining exchange between a PHY 103 and PHY 205 before the information processing apparatus according to the embodiment and a HUB establish a link;

FIG. 5 is a sequence chart showing an example of exchange between a PHY and MAC before the sequence shifts to LPI (Low Power Idle) when the EEE is enabled between the information processing apparatus according to the embodiment and the HUB;

FIG. 9 is a view for explaining the configuration of software to be executed by a CPU of an information processing apparatus according to the second embodiment;

FIG. 11 is a view for explaining the configuration of software to be executed by a CPU of an information processing apparatus according to the third embodiment;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention. Each of the embodiments of the present invention described below can be implemented solely or as a combination of a plurality of the embodiments or a combination of features thereof where necessary or where the combination of elements or features from individual embodiments in a single embodiment is beneficial.

Figure 1:
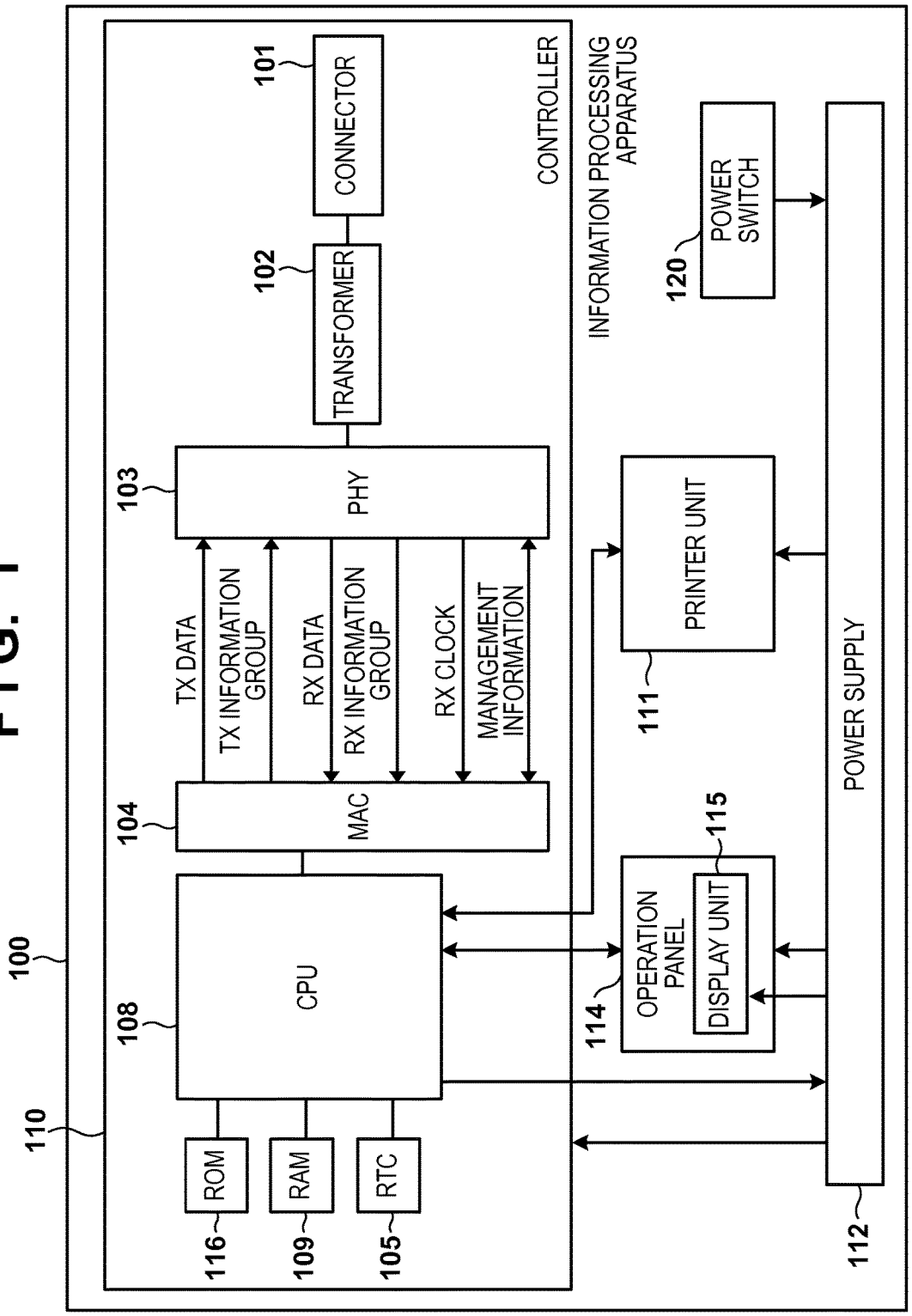
FIG. 1 is a block diagram showing the hardware configuration of an information processing apparatus according to an embodiment.

FIG. 1 is a block diagram showing the hardware configuration of an information processing apparatus 100 according to an embodiment of the present invention. The information processing apparatus 100 is a printing apparatus which can execute print processing in the present embodiment.

A controller 110 controls the overall operation of the information processing apparatus 100. A connector 101 connects the information processing apparatus 100 to a LAN cable. A transformer 102 electrically insulates the information processing apparatus 100 and a network. A PHY 103, arranged to operate as a communicating unit, is a physical layer which exchanges electrical signals with a connection destination when the information processing apparatus 100 connects to a LAN network. A MAC (Media Access Control) 104 converts a signal received via the PHY 103 into a frame to be processed by each device in the apparatus. A CPU 108 loads, in a RAM 109, a program stored in a ROM 116, and executes the loaded program, thereby controlling the operation of the apparatus. The RAM 109 provides a work area when the CPU 108 executes processing, and temporarily stores programs and various kinds of data. An RTC (Real Time Clock) 105 measures the present time, and notifies the CPU 108 of the time as needed, or notifies the CPU 108 of the elapse of set time by interrupt or the like. The ROM 116 stores programs to be executed by the CPU 108, and stores set values, initial data, and the like of the information processing apparatus 100. A printer unit 111 prints an image based on image data. An operation panel 114 includes a display unit 115 for displaying information of the information processing apparatus 100, and hard keys and the like for accepting an instruction from a user. Note that the display unit 115 may also have a touch panel function. A power supply 112 supplies electric power to each circuit and each unit of the information processing apparatus 100. The CPU 108 can control ON/OFF of the power supply 112, and the power supply 112 supplies power to the controller 110, printer unit 111, and display unit 115. The power supply 112 can also change the state of power supply to a supply destination under the control of the CPU 108. The electricity saving effect can be enhanced by thus stopping power supply to an unnecessary portion in accordance with the operating state of the information processing apparatus 100. A power switch 120 is a switch which switches on/off power supply from the power supply 112 to each unit.

Next, signals between the MAC 104 and PHY 103 will be explained.

TX data represents transmission data to be transmitted from the MAC 104 to the PHY 103, and a TX information group represents the transmission state of the transmission data from the MAC 104 to the PHY 103. This TX information group contains a transmission enabled state and transmission error state from the MAC 104. RX data represents reception data which the MAC 104 receives from the PHY 103, and an RX information group represents the state of the reception data which the MAC 104 receives from the PHY 103. The RX information group contains the detection state of the reception data and error information of the reception data. An RX clock is synchronized with the RX data which the MAC 104 receives from the PHY 103. Management information is bidirectionally exchanged between the PHY 103 and MAC 104.

Figure 2:
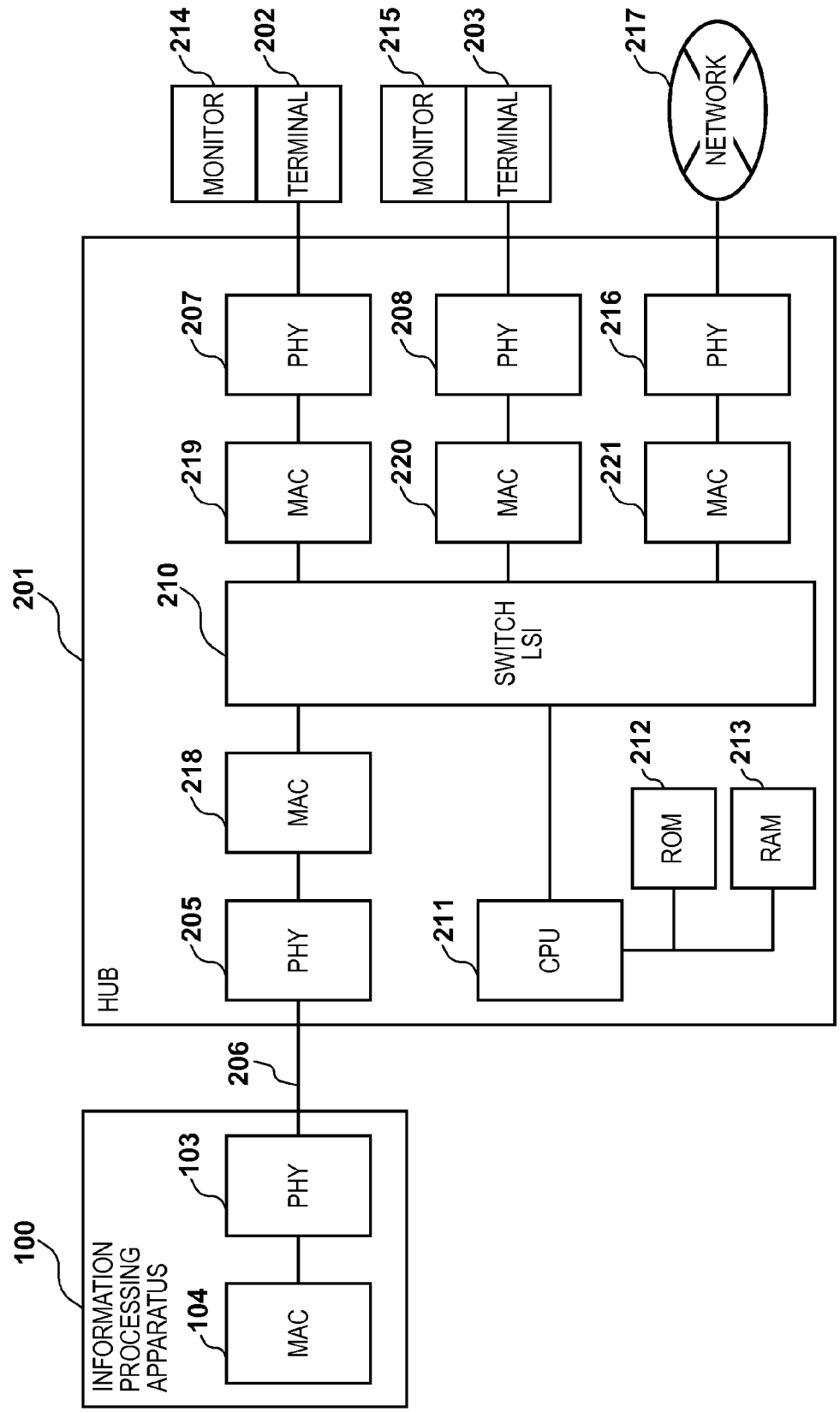
FIG. 2 is a view showing an example of the connection form of the information processing apparatus according to the embodiment.

FIG. 2 is a view showing an example of the connection state of the information processing apparatus 100 according to this embodiment.

A HUB 201 can connect to a plurality of LAN networks, and performs packet exchange and packet broadcast transfer. A PHY 205 is a physical layer which the HUB 201 uses when connecting to another information processing apparatus, and has the same functions as those of the PHY 103 of the information processing apparatus 100. The HUB 201 is arranged to operate as an external apparatus for communicating with the PHY 103 of the information processing apparatus 100. Note that in this embodiment, the connection destination of another information processing apparatus for the PHY 205 is the PHY 103 of the information processing apparatus 100. A MAC 218 is a MAC of the HUB 201 and has the same functions as those of the MAC 104 of the information processing apparatus 100. Terminals 202 and 203 are terminals which request printing to the information processing apparatus 100. Monitors 214 and 215 are connected to the terminals 202 and 203 and display information from the terminals 202 and 203, respectively. PHYs 207 and 208 are used when connecting to the terminals 202 and 203, respectively, and have the same functions as those of the PHY 103. MACs 219 and 220 are respectively connected to the PHYs 207 and 208, and have the same functions as those of the MAC 104. A network 217 connects the HUB 201 to an external network such as the Internet. A PHY 216 is connected to the network 217 and has the same functions as those of the PHY 103. A MAC 221 is connected to the PHY 216 and has the same functions as those of the MAC 104. A LAN cable 206 connects the information processing apparatus 100 and HUB 201, and is used in communication. The information processing apparatus 100 is connected to the LAN cable 206 via the connector 101. The terminals 202 and 203 are also connected to the HUB 201. Accordingly, the information processing apparatus 100 can communicate with the terminals 202 and 203 via the HUB 201.

A switch LSI 210 transfers packets received via the MACs 218, 219, 220, and 221 in a predetermined direction. A CPU 211 executes a command on an internal device of the HUB 201. A RAM 213 provides a work area for temporarily storing various kinds of data when the CPU 211 executes processing. A ROM 212 stores programs to be executed by the CPU 211, and stores set values, initial data, and the like of the HUB 201. The CPU 211 executes a command such as setting change on the PHYs 205, 207, 208, and 216 and the switch LSI 210.

In this embodiment, the PHY 103 supports the LPI of the EEE. The LPI is a function which suppresses power consumption by stopping some functions of the PHY 103 and MAC 104 if no packet exchange has occurred on the PHY 103 for a predetermined period. In this case, the communication rate of the PHY 103 is not changed, and the network link is not disconnected. Note that conditions under which the LPI is enabled are that the PHY 205 as the connection destination of the PHY 103 has the same functions as those of the PHY 103, and the EEE function is set to be usable in the two PHYs.

Figure 3:
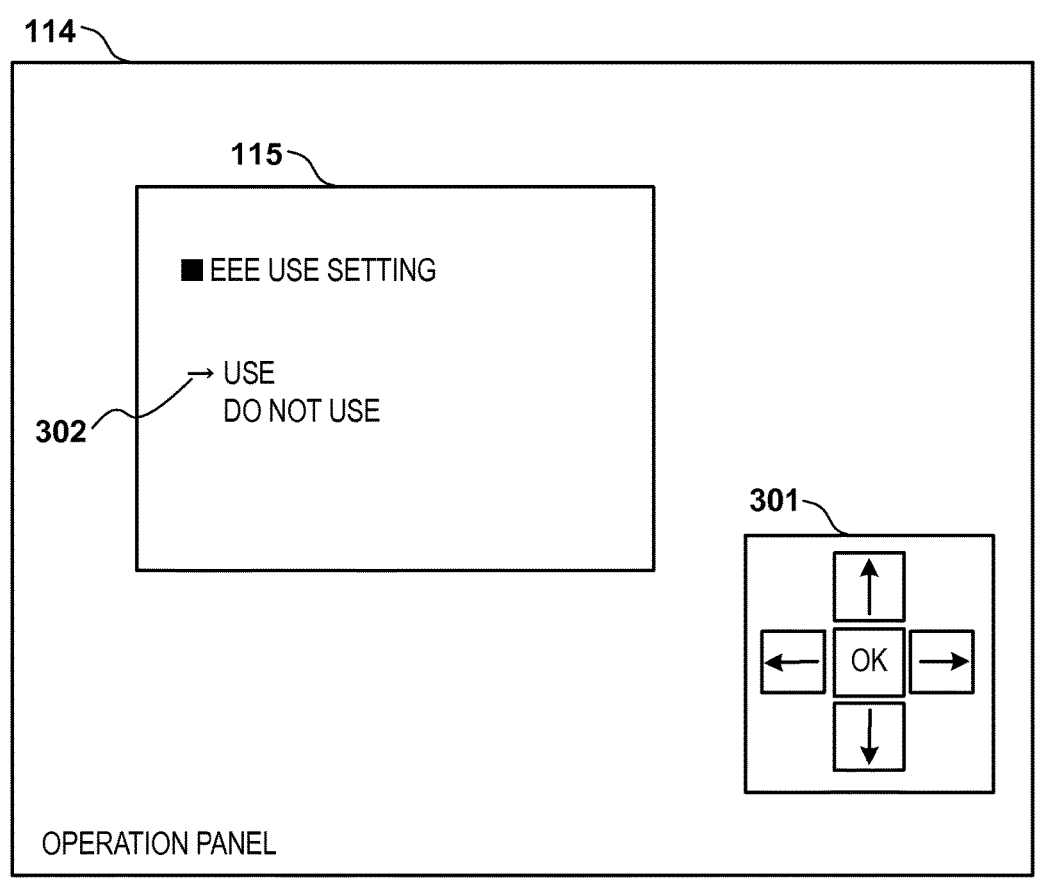
FIG. 3 is a view for explaining a display example of a screen for setting whether to use the EEE in the information processing apparatus according to the embodiment.

FIG. 3 is a view for explaining a display example of a screen for setting whether to use the EEE in the information processing apparatus 100 according to the embodiment. Note that setting by the user is not always necessary. For example, the EEE function may always be set to be usable.

The display unit 115 of the operation panel 114 can display a command received by the operation panel 114 from the CPU 108. Also, when using a touch panel as the display unit 115, the user can execute a command by directly touching the display unit 115. The user can transmit an instruction to the CPU 108 by operating a select button 301. The user selects or decides contents displayed on the display unit 115 by operating the select button 301.

When setting the EEE function of the information processing apparatus 100 to "USE" in FIG. 3, the user moves a cursor 302 displayed on the display unit 115 to "USE" by using arrow buttons of the select button 301, and presses an "OK" button of the operation button 301. On the other hand, when not using the EEE, the user moves the cursor 302 to "DO NOT USE" and presses the "OK" button of the operation button 301.

A method of setting a power saving state in which the power consumption is reduced when the LPI of the EEE is enabled in the information processing apparatus 100 will be explained below.

FIG. 4 is a sequence chart for explaining exchange between the PHYs 103 and 205 before the information processing apparatus 100 according to the embodiment and the HUB 201 establish a link.

After the information processing apparatus 100 is activated, the PHYs 103 and 205 start exchanging FLP in step S401. The FLP is a signal for notifying a PHY of the connection destination of settable information in order to decide a mode after the establishment of a PHY link, for example, the establishment of a link and the maximum communication rate of a LAN network. When the PHY has the EEE function, whether the EEE is enabled/disabled is also decided.

Then, in step S402, the PHYs 103 and 205 execute negotiation based on the exchanged FLP. After that, in step S403, the PHY settings including the communication rate and enable/disable of the EEE are decided, and a link is established. In this step, the communication rate is normally set by the negotiation from communication rates indicated by the exchanged FLP such that the communication rate is common and maximum. Note that the maximum communication rate of the PHY 103 according to this embodiment is set from 1,000, 100, and 10 Mbps. Also, the power consumption of the PHY 103 and MAC 104 generally increases in accordance with the communication rate set in the PHY 103. Therefore, the power consumption is maximum when the communication rate set in the PHY 103 is a maximum of 1,000 Mbps in this embodiment as well. Note also that the power consumption of the PHY 103 and MAC 104 decreases as the maximum communication rate set in the PHY 103 decreases to 100 and 10 Mbps.

Information indicating whether the EEE is usable is also exchanged by the FLP. If the EEE is usable in both the PHYs 103 and 205, therefore, the function of the EEE is enabled as a result of the negotiation. If the EEE is not usable in one of the PHYs 103 and 205, the function of the EEE is disabled as a result of the negotiation.

If a link is established in step S403, packet exchange becomes possible in step S404.

Note that when exchanging the FLP in step S401, settable communication rates of each PHY are normally notified. However, the communication rates to be notified may also be restricted by presetting the PHY. For example, when the possible maximum communication rate of the PHY 103 is 1,000 Mbps, the communication partner can be notified of this information by the FLP. However, it is also possible, by changing the internal settings of the PHY 103, to notify the communication partner that a lower communication rate is the capability of the PHY 103. This can be performed by the CPU 108 by disabling 1,000 Mbps from the set values of the PHY 103 beforehand by using management information. In this case, if settings of communication rates such as 100 and 10 Mbps are enabled, the communication partner is notified of these communication rates by the FLP.

FIG. 5 is a sequence chart showing an example of exchange between the PHY 103 and MAC 104 before the sequence shifts to the LPI (Low Power Idle) when the EEE is enabled between the information processing apparatus 100 according to the embodiment and the HUB 201.

In step S501, in a state in which the link of the PHY 103 is established and the sequence has not shifted to the LPI, the PHY 103 transmits signals to the MAC 104. In this step, the PHY 103 transmits, by RX data, an idle pattern in which electrical High and Low levels alternately change, and also transmits an RX clock. In step S502, the PHY 103 has not detected any traffic for a predetermined time, and the conditions for shifting to the LPI are satisfied. In step S503, the PHY 103 notifies the MAC 104 that the sequence can shift to the LPI, by changing the RX data and RX information group to a specific pattern. In response to this notification, the MAC 104 shifts to the LPI. After that, in step S504, the PHY 103 stops the transmission of the RX clock, and shifts to the power saving state in which the power consumption is suppressed.

Then, traffic occurs in step S505, so the PHY 103 detects that the conditions for shifting to the LPI are canceled. In step S506, the PHY 103 cancels the specific pattern of the RX data and RX information group, thereby notifying the MAC 104 that the state in which a shift to the LPI is possible is canceled. In response to this notification, the MAC 104 returns from the LPI. In step S507, the PHY 103 starts transmitting, by RX data, an idle pattern in which electrical High and Low levels alternately change, and also starts transmitting an RX clock.

The foregoing is an example of exchange between the PHY 103 and MAC 104 when the sequence shifts to the LPI and returns from it. When the LPI of the EEE is enabled, this sequence is repeated in accordance with traffic occurring in the network. That is, after step S507, if the PHY 103 has not detected any traffic again for a predetermined period, the sequence returns to the state in step S502; if traffic occurs, the sequence returns to the state in step S507 again. Thus, the PHY 103 and MAC 104 repeat the above-mentioned operation when the LPI of the EEE is enabled.

As a method of further enhancing the power saving effect of the information processing apparatus 100 other than the method of enabling the LPI, a higher power saving effect can be obtained by connecting to a network by decreasing the communication rate when the PHY 103 establishes a link. When the PHYs 103 and 205 decide the communication rate by a method called auto negotiation, a link is normally established at a maximum communication rate settable by both the PHYs. However, the power consumption of a PHY increases in proportion to the set communication rate of the PHY. Therefore, the power saving effect of the information processing apparatus 100 can further be enhanced by decreasing the communication rate of the PHY 103 in accordance with the operating state of the information processing apparatus 100.

The electricity saving function of the information processing apparatus 100 according to this embodiment will now be explained.

Figure 6A:
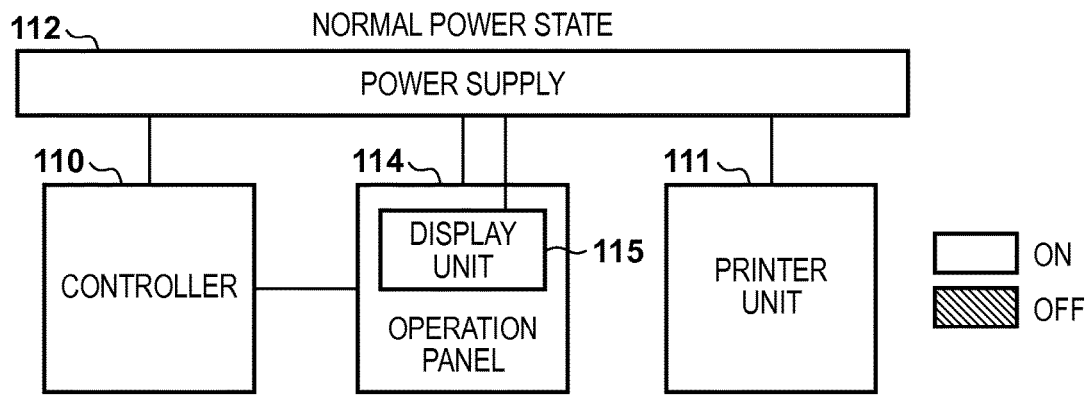
FIGS. 6A to 6C are views for explaining the electricity saving function of the information processing apparatus according to the embodiment.
Figure 6B:
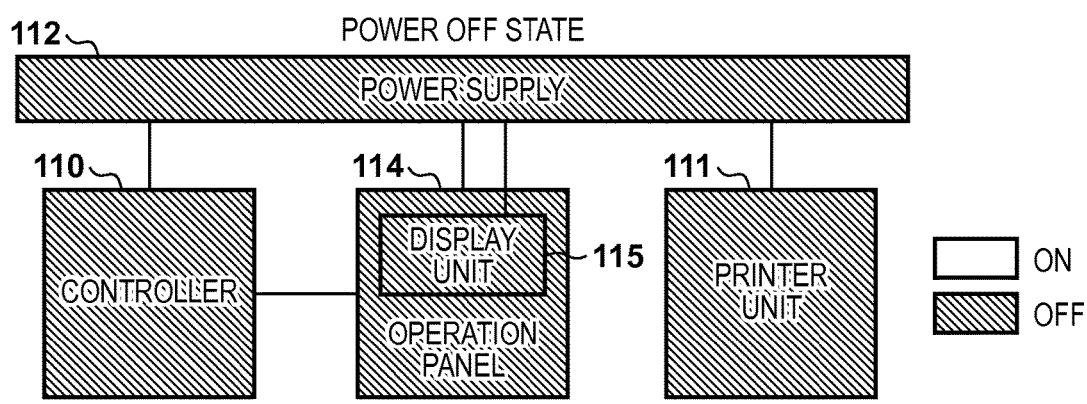
Figure 6C:
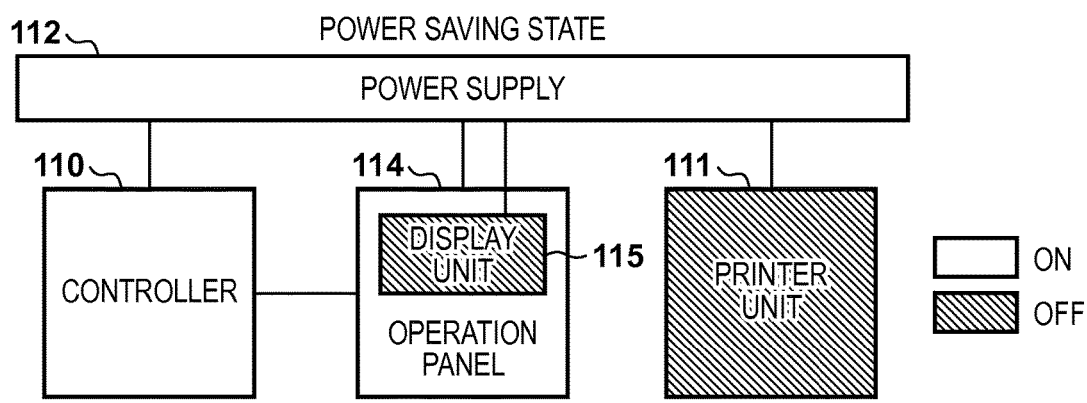

FIGS. 6A to 6C are views for explaining the electricity saving function (power saving function) of the information processing apparatus 100 according to the embodiment.

FIG. 6A shows a case in which the information processing apparatus 100 is in a normal power state (normal power mode). In this state, electric power is supplied to each unit of the information processing apparatus 100.

When predetermined conditions are satisfied in this normal power state, the apparatus shifts to a power saving state (power saving mode) shown in FIG. 6C. Also, when the power supply is turned off by the power switch 120 in the normal power state, the apparatus shifts to a power OFF state shown in FIG. 6B.

In the power OFF state shown in FIG. 6B, power supply to each unit of the information processing apparatus 100 is stopped. When the power switch 120 is turned on in this power OFF state, the apparatus shifts to the normal power state shown in FIG. 6A.

In the power saving state shown in FIG. 6C, power supply to the controller 110 and operation panel 114 is maintained, and power supply to the printer unit 111 and display unit 115 is stopped. When the power saving state shown in FIG. 6C and the normal power state shown in FIG. 6A are compared, the power saving state is a power state in which the power consumption is smaller than that in the normal power state.

When the information processing apparatus 100 has received a packet in the power saving state, the apparatus must return from the power saving state to the normal power state in order to process the packet. However, when the apparatus has received a packet processable in the power saving state, the power reducing effect is further enhanced if the apparatus does not return to the normal power state. Therefore, a packet (to be referred to as a proxy response packet hereinafter) processable in the power saving state is registered, and, when this packet is received in the power saving state, the apparatus does not return from the power saving state to the normal power state. Also, when a packet (to be referred to as an electricity saving cancellation packet) other than the proxy response packet, such as a print job, is received, the apparatus shifts from the power saving state to the normal power state in order to process the packet. The apparatus also shifts to the normal power state when the operation panel 114 is operated in the power saving state.

If the information processing apparatus 100 detects in the normal power state that no electricity saving cancellation packet has been received and the operation panel 114 has not been operated for a predetermined time, the information processing apparatus 100 determines that no problem arises even if some functions of the apparatus are stopped, and shifts to the power saving state.

As described above, examples of the electricity saving method in the information processing apparatus 100 other than the use of the EEE function are the method of changing the communication rate of the PHY 103 to a low rate, and the method of controlling power supply in accordance with the operating state. When the communication rate of the PHY 103 is changed to a low rate in the power saving state, the power saving effect of the information processing apparatus 100 can maximally be enhanced. Also, the communication rate of the PHY 103 changed to a low rate is set to a high rate again as the apparatus returns from the power saving state to the normal power state. This can maintain the network performance.

When the LPI of the EEE is enabled, however, the communication rate of the PHY cannot be dropped to 10 Mbps. This is so because the LPI itself does not support a 10Base mode which operates at a maximum communication rate of 10 Mbps. Accordingly, although the communication rate of the PHY can be set at 10 Mbps, the LPI is disabled in that case, so the LPI of the partner apparatus is also disabled. As a result, the power consumption of the information processing apparatus 100 can be reduced, but the LPI of the partner apparatus is disabled, so the total power consumption of the two apparatuses may rise.

In addition, link disconnection occurs when changing the communication rate of the PHY 103 to a low rate. Link disconnection similarly occurs when changing the communication rate of the PHY 103 to a high rate as well. This is a normal operation of the PHY. When the communication rate of the PHY 103 is changed in addition to a shift to the power saving state, therefore, a time for disconnecting the link of the PHY 103 is produced, so the total communication time prolongs. If a packet is transmitted in this period, packet dropping may occur. To prevent this packet dropping caused by link disconnection, a method which does not change the communication rate when shifting to the power saving state is also possible. In this case, the LPI is enabled, but the power consumption becomes larger than that when the communication rate of the PHY is decreased. In embodiments to be explained below, therefore, optimum settings of the PHY 103 matching the power saving state will be proposed, thereby proposing an optimum control method of the power saving state and PHY 103, which is not taken into account in the conventional information processing apparatuses.

First Embodiment

Figure 7:
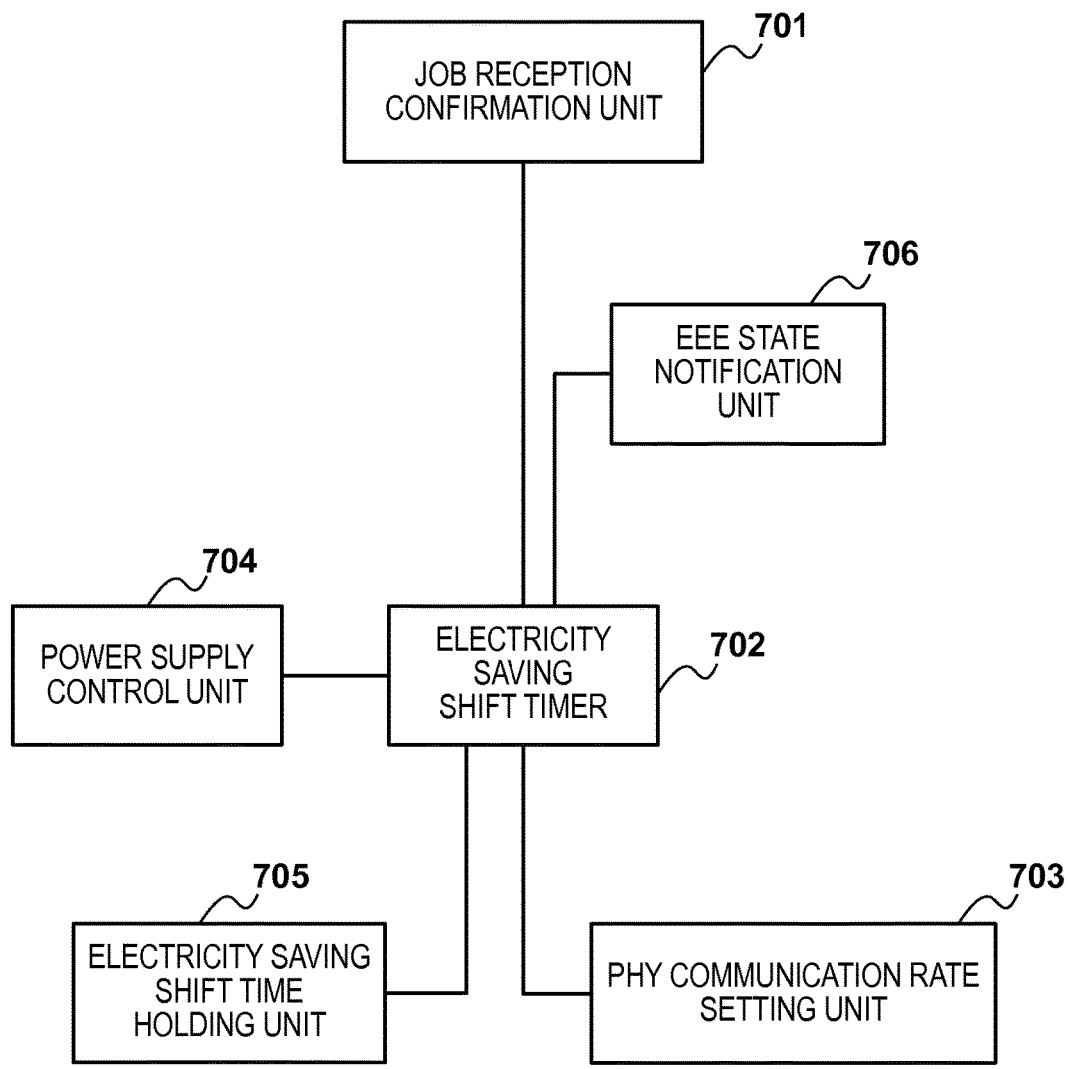
FIG. 7 is a view for explaining the configuration of software to be executed by a CPU of an information processing apparatus according to the first embodiment.

FIG. 7 is a view for explaining the configuration of software to be executed by a CPU 108 of an information processing apparatus 100 according to the first embodiment of the present invention.

A job reception confirmation unit 701 determines whether the information processing apparatus 100 has received an electricity saving cancellation packet or has accepted an operation from an operation panel 114. An electricity saving shift timer 702 measures a time during which the information processing apparatus 100 has not received an electricity saving cancellation packet and has not accepted an operation from the operation panel 114 in succession. If the job reception confirmation unit 701 confirms the reception of an electricity saving cancellation packet or the acceptance of an operation from the operation panel 114, the job reception confirmation unit 701 notifies the electricity saving shift timer 702 of this information. A PHY communication rate setting unit 703 sets a communication rate in a PHY 103 in accordance with a command from the electricity saving shift timer 702. A power supply control unit 704 receives a command from the electricity saving shift timer 702, and designates a power supply destination to a power supply 112. In an electricity saving shift time holding unit 705, the job reception confirmation unit 701 sets a time during which an electricity saving cancellation packet is not received in succession and a time during which the operation panel 114 is not operated in succession, in order for the information processing apparatus 100 to shift from the normal power state to the power saving state. The user can set an arbitrary value by operating the operation panel 114, as the value to be set in the electricity saving shift time holding unit 705. An EEE state notification unit 706 holds a state indicating whether the EEE is enabled when the PHY 103 establishes a link to a LAN network after the information processing apparatus 100 is activated, and notifies the electricity saving shift timer 702 of this state.

After the information processing apparatus 100 is activated, the electricity saving shift timer 702 starts time measurement. If an electricity saving cancellation packet is received or an operation from the operation panel 114 is accepted in the normal power state, the job reception confirmation unit 701 notifies the electricity saving shift timer 702 of the reception of the job. If the electricity saving shift timer 702 receives the notification indicating the job reception from the job reception confirmation unit 701 after the time measurement is started and before the time held in the electricity saving shift time holding unit 705 is reached, the electricity saving shift timer 702 clears the time measured up to the point to 0. If the electricity saving shift timer 702 does not receive any job reception notification from the job reception confirmation unit 701 after the time measurement is started and before the time held in the electricity saving shift time holding unit 705 is reached, the electricity saving shift timer 702 commands the power supply control unit 704 to shift to the power saving state. Accordingly, the power supply control unit 704 instructs the power supply 112 to shift to the power saving state.

When shifting to the power saving state, if the electricity saving shift timer 702 is notified by the EEE state notification unit 706 that the EEE is enabled, the electricity saving shift timer 702 instructs the PHY communication rate setting unit 703 to change the communication rate to the lowest communication rate within the range in which the LPI is enabled. Consequently, the PHY 103 disconnects the link because the PHY communication rate setting unit 703 has changed the communication rate, and starts transmitting FLP based on the new setting information of the PHY 103. When negotiation is completed after the FLP is transmitted, the PHY 103 reestablishes a link at the lowest communication rate within the range in which the LPI is enabled. By performing this control, the information processing apparatus 100 enables the LPI of the EEE and sets the communication rate of the PHY 103 at a low rate at the same time. This makes it possible to achieve the effect of reducing the power consumption of the PHY 103 while using the LPI by the two connected apparatuses.

Also, the EEE may be disabled depending on the environment of the information processing apparatus 100. An example is a case in which the EEE is not enabled in a partner apparatus to which the information processing apparatus 100 connects across a LAN network. Control in a case like this will be explained below.

If the EEE state notification unit 706 has notified the electricity saving shift timer 702 that the EEE is disabled, the electricity saving shift timer 702 sets, when shifting to the power saving state, a low communication rate at which the network power is minimum in the PHY communication rate setting unit 703. After the PHY communication rate setting unit 703 has changed the communication rate, the PHY 103 establishes a link at the new communication rate through negotiation. In this state, the PHY 103 is set at the communication rate at which the network power is minimum, so the electricity saving effect of the information processing apparatus 100 is maximized.

Figure 8:
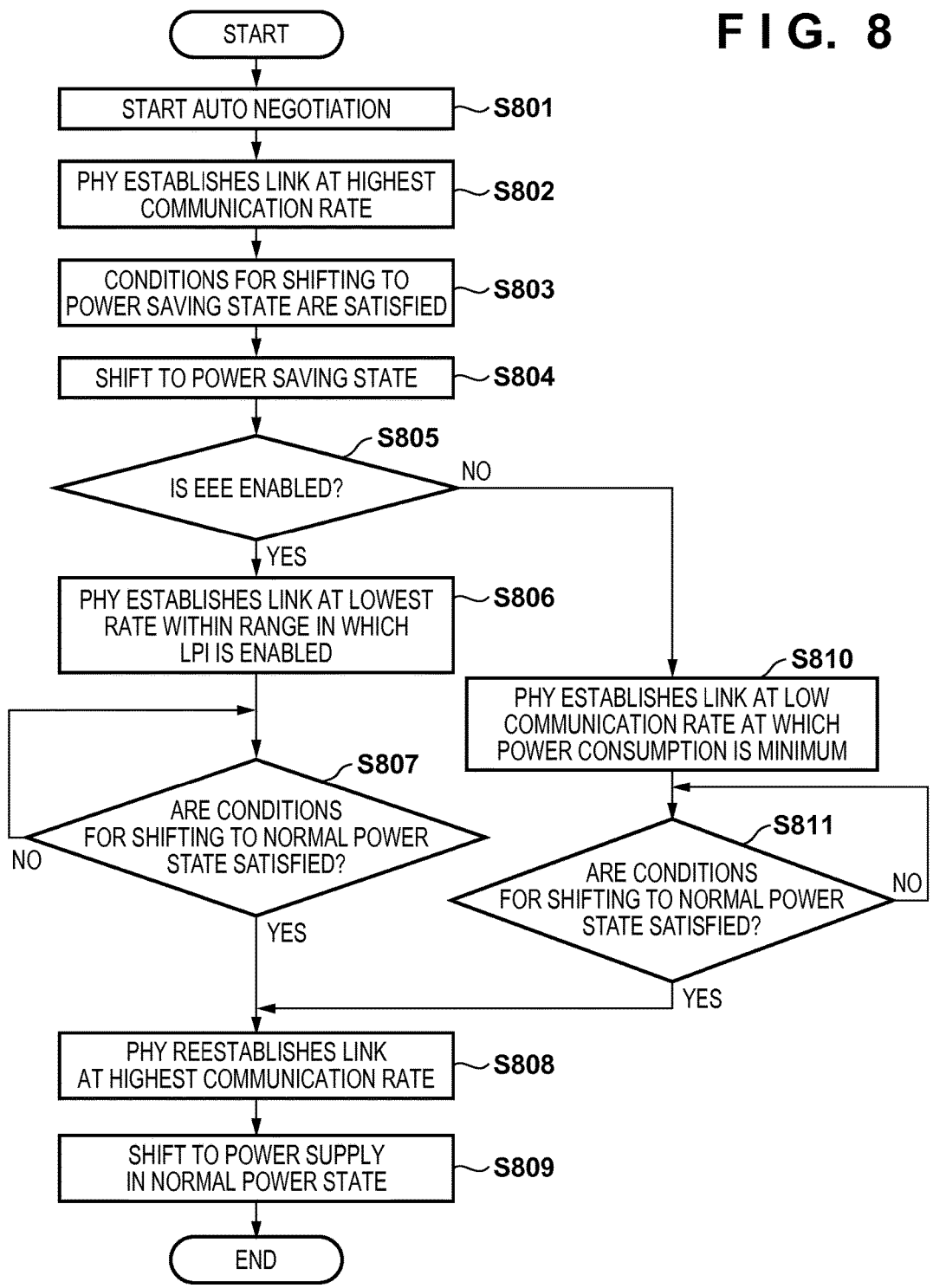
FIG. 8 is a flowchart for explaining a process of setting the communication rate of a PHY in a power saving state performed by the information processing apparatus according to the first embodiment.

FIG. 8 is a flowchart for explaining the PHY communication rate setting process in the electricity saving state performed by the information processing apparatus 100 according to the first embodiment. Note that a program for executing this process is stored in a ROM 116, and executed under the control of the CPU 108 after being loaded in a RAM 109. Note that the CPU 108 executes individual steps in the following flowchart, but these steps will be explained as processing executed by the units shown in the software configuration of FIG. 7.

This process is started when the information processing apparatus 100 is powered on. First, in step S801, the CPU 108 starts auto negotiation by exchanging FLP by the PHY 103. After this auto negotiation is executed, the CPU 108 determines whether the EEE settings in the PHY 103 and in a PHY 205 of a HUB 201 indicate that the EEE is usable. If the EEE function is enabled and the EEE is set to be usable, "EEE is enabled" is held in the EEE state notification unit 706. If the EEE setting in one of the PHYs 103 and 205 indicates that the EEE is not usable, the EEE function is disabled, so "EEE is disabled" is held in the EEE state notification unit 706. Note that whether to use the EEE function of the PHY 103 is set by the operation screen shown in FIG. 3 described above. As described previously, however, the EEE function may also be set to be usable at all times.

Then, the process advances to step S802, and the CPU 108 causes the PHY 103 to establish a link to a LAN network. In this step, the communication rate of the PHY 103 is also decided. The communication rate is normally set at the highest rate settable (supportable) between the PHY 103 and an apparatus in the connection destination. Assume that the maximum communication rate of the PHY 103 is set at 1,000 Mbps in step S802.

Subsequently, the process advances to step S803, and the electricity saving shift timer 702 determines whether there is notification from the job reception confirmation unit 701 during the period set in the electricity saving shift time holding unit 705. If there is no notification in this period, the electricity saving shift timer 702 determines that the conditions for shifting to the power saving state are satisfied. In step S804, the electricity saving shift timer 702 instructs the power supply control unit 704 to shift to the power saving state. Accordingly, the power supply control unit 704 shifts to the power saving state as shown in FIG. 6C by controlling the power supply 112.

The process advances to step S805, and the electricity saving shift timer 702 determines whether the EEE of the PHY 103 is enabled. This determination is performed by referring to the determination result of the auto negotiation in step S801, which is stored in the EEE state notification unit 706. If it is determined in step S805 that the EEE is enabled, the process advances to step S806. In step S806, the electricity saving shift timer 702 causes the PHY communication rate setting unit 703 to set the communication rate of the PHY 103 at a minimum rate within the range in which the LPI is enabled. In this embodiment, the maximum communication rate of the PHY 103 is set at 100 Mbps in step S806. After that, the PHY 103 executes negotiation and establishes a link to the LAN network by the new settings. The process then advances to step S807, and the electricity saving shift timer 702 determines whether the conditions for shifting to the normal power state are satisfied. For example, if the electricity saving shift timer 702 receives notification from the job reception confirmation unit 701, the electricity saving shift timer 702 determines that the conditions for shifting to the normal power state are satisfied, and the process advances to step S808. In step S808, the electricity saving shift timer 702 causes the PHY communication rate setting unit 703 to set the communication rate of the PHY 103 at the highest communication rate within a possible range. In this embodiment, the maximum communication rate of the PHY 103 is set at 1,000 Mbps in step S808. After that, the PHY 103 executes negotiation and establishes a link by the new settings, and the process advances to step S809. In step S809, the electricity saving shift timer 702 instructs the power supply control unit 704 to shift to the normal power state. Consequently, the power supply control unit 704 controls the power supply 112 to shift to a power supply state in the normal power state, and terminates the process.

On the other hand, if the electricity saving shift timer 702 determines in step S805 that the EEE is disabled, the process advances to step S810, and the electricity saving shift timer 702 causes the PHY communication rate setting unit 703 to set the communication rate of the PHY 103 at a supported low communication rate at which the power consumption is minimum. In this embodiment, the maximum communication rate of the PHY 103 is set at 10 Mbps in step S810. After that, the PHY 103 executes negotiation and establishes a link by the new settings. Subsequently, the process advances to step S811, and the electricity saving shift timer 702 determines whether the conditions for shifting to the normal power state are satisfied, in the same manner as in step S807. If the shift conditions are satisfied, the electricity saving shift timer 702 advances the process to step S808, and executes the above-described processing.

In the first embodiment as explained above, when the EEE function is enabled, the communication rate of the PHY is decreased while enabling the LPI of the EEE. As a consequence, the power consumption can be reduced while both of the two connected apparatuses are using the LPI. Also, if the EEE function is disabled, the communication rate of the PHY is set at a low communication rate at which the power consumption of the network is minimized. This can effectively maximize the electricity saving effect.

Second Embodiment

The second embodiment of the present invention will be explained below. Note that the arrangement of an information processing apparatus 100 according to the second embodiment and the connection form of the information processing apparatus 100 are the same as those of the above-described first embodiment, so an explanation thereof will be omitted.

FIG. 9 is a view for explaining the configuration of software to be executed by a CPU 108 of the information processing apparatus 100 according to the second embodiment of the present invention. Note that the same reference numerals as in FIG. 7 of the first embodiment denote the same parts in FIG. 9, and an explanation thereof will be omitted.

An electricity saving determination unit 901 measures a time during which the information processing apparatus 100 has not received an electricity saving cancellation packet and has not accepted an operation from an operation panel 114 in succession, and determines whether to shift to the power saving state.

After the information processing apparatus 100 is activated, the electricity saving determination unit 901 starts time measurement. If an electricity saving cancellation packet is received or a user's operation is accepted from the operation panel 114 in the normal power state, a job reception confirmation unit 701 notifies the electricity saving determination unit 901 of this information. If the electricity saving determination unit 901 receives the notification from the job reception confirmation unit 701 after the time measurement is started and before a time held in a electricity saving shift time holding unit 705 is reached, the electricity saving determination unit 901 clears the time measured up to the point to 0. Also, if the electricity saving determination unit 901 does not receive any notification from the job reception confirmation unit 701 after the time measurement is started and before the time held in the electricity saving shift time holding unit 705 is reached, the electricity saving determination unit 901 commands a power supply control unit 704 to shift to the power saving state. When shifting to the power saving state, if the electricity saving determination unit 901 is notified by an EEE state notification unit 706 that the EEE is enabled, the electricity saving determination unit 901 performs particularly no processing on a PHY communication rate setting unit 703.

On the other hand, if the EEE state notification unit 706 notifies the electricity saving determination unit 901 that the EEE is disabled, the electricity saving determination unit 901 sets the communication rate of a PHY 103 at a low communication rate at which the power consumption of a network is minimum, when shifting to the power saving state. When the PHY communication rate setting unit 703 thus sets the communication rate at a low rate, the PHY 103 establishes a link at the communication rate of the new settings through negotiation. In this state, the communication rate of the PHY 103 is set at the rate at which the power consumption of the network is minimum, so the electricity saving effect of the information processing apparatus 100 is maximized.

By performing the control as described above, when the EEE is enabled, the communication rate of the PHY 103 is not changed regardless of whether the information processing apparatus 100 shifts to the power saving state. Therefore, the power consumption becomes larger than that when the communication rate of the PHY 103 is decreased, but a high electricity saving effect is obtained by enabling the EEE. Also, since the communication rate of the PHY 103 is not changed when shifting to the power saving state, no link disconnection occurs, so packet dropping can be prevented.

Figure 10:
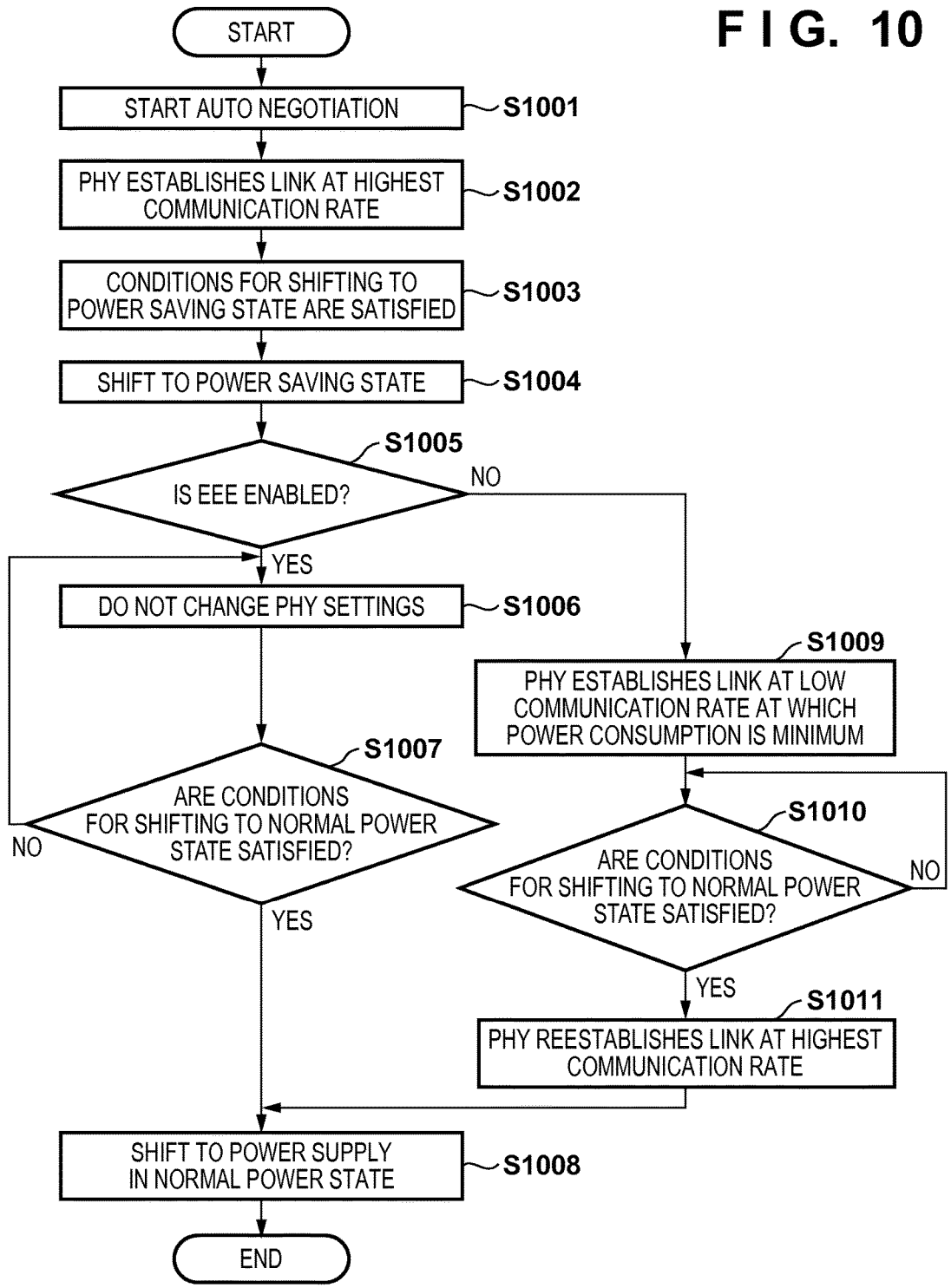
FIG. 10 is a flowchart for explaining a process of setting the communication rate of a PHY in a power saving state performed by the information processing apparatus according to the second embodiment.

FIG. 10 is a flowchart for explaining the PHY communication rate setting process in the electricity saving state performed by the information processing apparatus 100 according to the second embodiment. Note that a program for executing this process is stored in a ROM 116, and executed under the control of the CPU 108 after being loaded in a RAM 109. Note that the CPU 108 executes individual steps in the following flowchart, but these steps will be explained as processing executed by the units shown in the software configuration of FIG. 9.

This process is started when the information processing apparatus 100 is powered on. Note that processes in steps S1001 and S1002 of FIG. 10 are the same as those in steps S801 and S802 of FIG. 8 of the above-described first embodiment, so an explanation thereof will be omitted.

In step S1003, the electricity saving determination unit 901 determines whether there is notification from the job reception confirmation unit 701 during the period set in the electricity saving shift time holding unit 705. If there is no notification in this period, the electricity saving determination unit 901 determines that the conditions for shifting to the power saving state are satisfied. In step S1004, the electricity saving determination unit 901 instructs the power supply control unit 704 to shift to the power saving state. Accordingly, the power supply control unit 704 shifts to the power saving state as shown in FIG. 6C by controlling a power supply 112.

Then, the process advances to step S1005, and the electricity saving determination unit 901 determines whether the EEE of the PHY 103 is enabled. This determination is performed by referring to the determination result in step S1001, which is stored in the EEE state notification unit 706. If it is determined that the EEE is enabled, the process advances to step S1006. In step S1006, the electricity saving determination unit 901 continues the LAN network link and communication without changing the communication rate of the PHY 103. Accordingly, the communication rate of the PHY 103 is kept at a maximum of 1,000 Mbps. The process then advances to step S1007, and the electricity saving determination unit 901 determines whether the conditions for shifting to the normal power state are satisfied. For example, if the electricity saving determination unit 901 receives notification from the job reception confirmation unit 701 and determines that the conditions for shifting to the normal power state are satisfied, the process advances to step S1008; if not, the process in step S1007 is executed. In step S1008, the electricity saving determination unit 901 causes the power supply control unit 704 to shift to a power supply state in the normal power state, and terminates the process.

On the other hand, if the electricity saving determination unit 901 determines in step S1005 that the EEE is disabled, the process advances to step S1009, and the electricity saving determination unit 901 causes the PHY communication rate setting unit 703 to set the communication rate of the PHY 103 at a low communication rate at which the power consumption is minimum. Note that the communication rate of the PHY 103 is set at a maximum of 10 Mbps in step S1009. After that, the PHY 103 executes negotiation and establishes a LAN network link by the new settings. Subsequently, the process advances to step S1010, and the electricity saving determination unit 901 determines whether the conditions for shifting to the normal power state are satisfied, in the same manner as in step S1007. If the conditions for shifting to the normal power state are satisfied, the process advances to step S1011, and the electricity saving determination unit 901 causes the PHY communication rate setting unit 703 to set the communication rate of the PHY 103 at the highest communication rate within a possible range. In this embodiment, the communication rate of the PHY 103 is set at a maximum of 1,000 Mbps in step S1011. After that, the PHY 103 executes negotiation, establishes a link by the new settings, and advances the process to step S1008.

In the second embodiment as explained above, when the EEE function is enabled, the communication rate of the PHY is not changed. As a consequence, the power consumption can be reduced while both of the two connected apparatuses are using the LPI, and packet dropping is prevented. Also, if the EEE function is disabled, the communication rate of the PHY is set at a low communication rate at which the power consumption of the network is minimized. This can effectively maximize the electricity saving effect.

Third Embodiment

The third embodiment of the present invention will be explained below. Note that the arrangement of an information processing apparatus 100 according to the third embodiment and the connection form of the information processing apparatus 100 are the same as those of the above-described first embodiment, so an explanation thereof will be omitted. In the third embodiment, an example in which the information processing apparatus 100 has another power saving state called network electricity saving will be explained. In this network electricity saving, when a predetermined period has elapsed after the information processing apparatus 100 has shifted to the power saving state, the communication rate of a PHY 103 is decreased to a communication rate at which the power consumption is minimum.

FIG. 11 is a view for explaining the configuration of software to be executed by a CPU 108 of the information processing apparatus 100 according to the third embodiment of the present invention. Note that the same reference numerals as in FIG. 7 of the first embodiment denote the same parts in FIG. 11, and an explanation thereof will be omitted.

An NW (NetWork) electricity saving shift timer 1101 measures a time during which the information processing apparatus 100 has not received an electricity saving cancellation packet and an operation panel 114 has not been operated in succession. Also, after a shift to the power saving state, the NW electricity saving shift timer 1101 clears the measured time once, and measures the time again. An NW electricity saving shift time holding unit 1102 sets a time during which no notification is transmitted from a job reception confirmation unit 701 to the NW electricity saving shift timer 1101, in order for the information processing apparatus 100 having shifted to the power saving state to shift to network electricity saving. The user can set an arbitrary value by operating the operation panel 114, as the time to be set in the NW electricity saving shift time holding unit 1102.

After the information processing apparatus 100 is activated, the NW electricity saving shift timer 1101 starts time measurement. If an electricity saving cancellation packet is received or an operation is accepted from the operation panel 114 in the normal power state, the job reception confirmation unit 701 notifies the NW electricity saving shift timer 1101 of this information. If the NW electricity saving shift timer 1101 receives the notification from the job reception confirmation unit 701 after the time measurement is started and before a time held in a electricity saving shift time holding unit 705 is reached, the NW electricity saving shift timer 1101 clears the time measured up to the point to 0. If the NW electricity saving shift timer 1101 does not receive any notification from the job reception confirmation unit 701 after the time measurement is started and before the time held in the electricity saving shift time holding unit 705 is reached, the NW electricity saving shift timer 1101 notifies a power supply control unit 704 of this information, and causes the power supply control unit 704 to control a power supply 112 so as to shift to the power saving state. When shifting to the power saving state, if the NW electricity saving shift timer 1101 is notified by an EEE state notification unit 706 that the EEE is enabled, the NW electricity saving shift timer 1101 does not cause a PHY communication rate setting unit 703 to change the communication rate.

Also, after shifting to the power saving state, the NW electricity saving shift timer 1101 performs time measurement again. If the time measured in the power saving state reaches the time held in the NW electricity saving shift time holding unit 1102, the NW electricity saving shift timer 1101 causes the PHY communication rate setting unit 703 to set a low communication rate at which the power consumption of the PHY 103 is minimum. After that, the PHY 103 executes negotiation and establishes a LAN network link by the new settings.

Furthermore, the EEE may be disabled depending on the environment of the information processing apparatus 100. An example is a case in which the EEE is not enabled in a partner apparatus to which the information processing apparatus 100 connects across a LAN network. Control in a case like this will be explained below.

If the EEE state notification unit 706 has notified the NW electricity saving shift timer 1101 that the EEE is disabled, the NW electricity saving shift timer 1101 sets, when shifting to the power saving state, a low communication rate at which the network power is minimum in the PHY communication rate setting unit 703. After the PHY communication rate setting unit 703 has changed the communication rate, the PHY 103 establishes a link at the new communication rate through negotiation. In this state, the PHY 103 is set at the communication rate at which the network power consumption is minimum, so the electricity saving effect of the information processing apparatus 100 is maximized.

Also, immediately after shifting to the power saving state, the communication rate of the PHY 103 is not changed. The communication rate of the PHY 103 is changed to a communication rate at which the power consumption is minimum, after the traffic on the network has decreased and no electricity saving cancellation packet has been received for a predetermined period. This makes it possible to minimize the influence of link disconnection caused when the communication rate of the PHY 103 is changed, and maximally enhance the electricity saving effect of the information processing apparatus 100.

Figure 12:
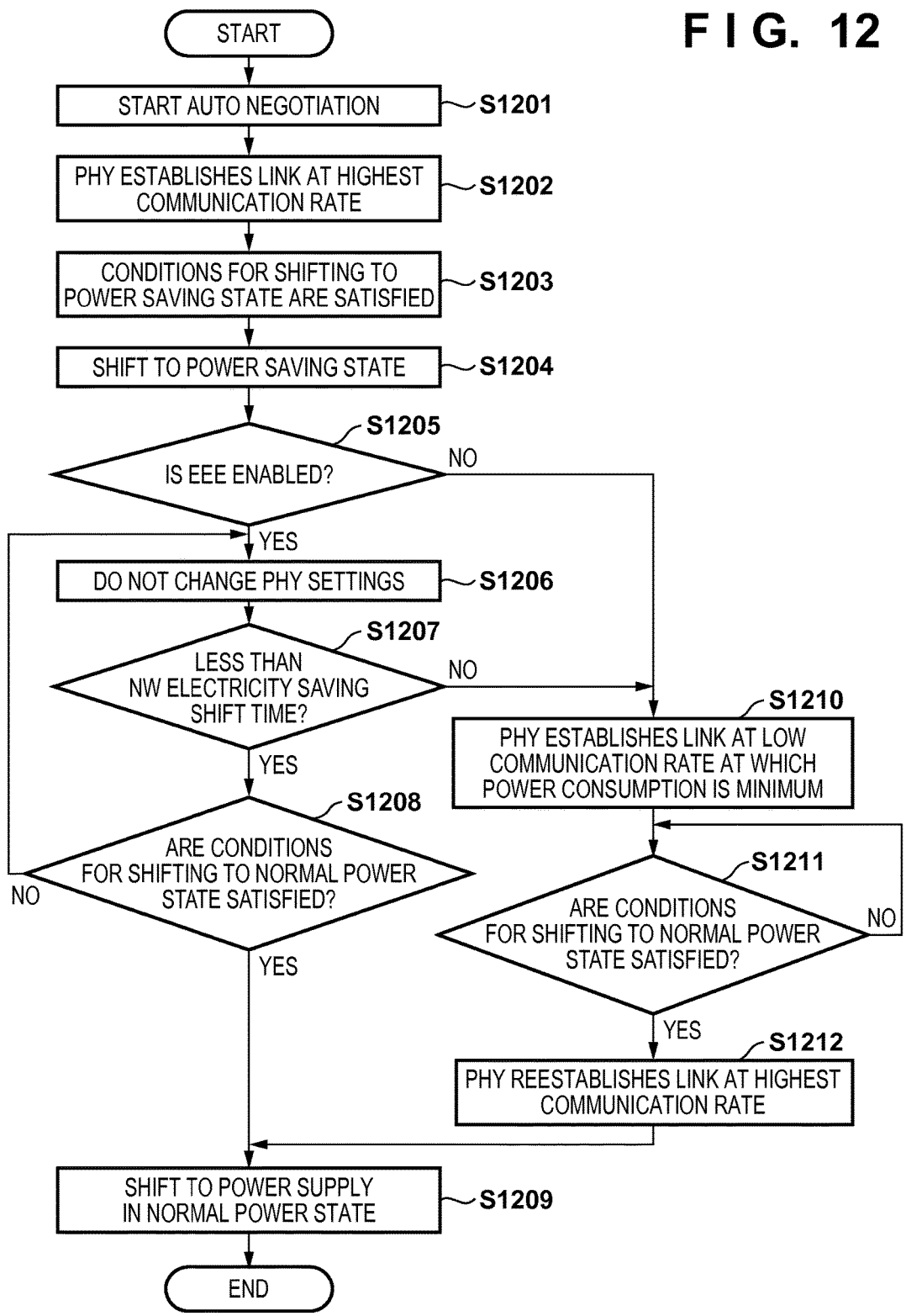
FIG. 12 is a flowchart for explaining a process of setting the communication rate of a PHY in a power saving state performed by the information processing apparatus according to the third embodiment.

FIG. 12 is a flowchart for explaining the PHY communication rate setting process in the electricity saving state performed by the information processing apparatus 100 according to the third embodiment. Note that a program for executing this process is stored in a ROM 116, and executed under the control of the CPU 108 after being loaded in a RAM 109. Note that the CPU 108 executes individual steps in the following flowchart, but these steps will be explained as processing executed by the units shown in the software configuration of FIG. 11.

This process is started when the information processing apparatus 100 is powered on. Note that processes in steps S1201 and S1202 of FIG. 12 are the same as those in steps S801 and S802 of FIG. 8 of the above-described first embodiment, so an explanation thereof will be omitted.

In step S1203, the NW electricity saving shift timer 1101 determines whether there is notification from the job reception confirmation unit 701 during the period set in the electricity saving shift time holding unit 705. If there is no notification in this period, the NW electricity saving shift timer 1101 determines that the conditions for shifting to the power saving state are satisfied. In step S1204, the NW electricity saving shift timer 1101 instructs the power supply control unit 704 to shift to the power saving state. Accordingly, the power supply control unit 704 shifts to the power saving state as shown in FIG. 6C by controlling the power supply 112.

Then, the process advances to step S1205, and the NW electricity saving shift timer 1101 determines whether the EEE of the PHY 103 is enabled. This determination is performed by referring to the determination result in step S1201, which is stored in the EEE state notification unit 706. If it is determined in step S1205 that the EEE of the PHY 103 is enabled, the process advances to step S1206, and the NW electricity saving shift timer 1101 continues the LAN network link and communication without changing the communication rate of the PHY 103. Accordingly, the communication rate of the PHY 103 is kept at a maximum of 1,000 Mbps.

The process then advances to step S1207, and the NW electricity saving shift timer 1101 determines whether the measured time is less than the time held in the NW electricity saving shift time holding unit 1102. If the measured time is less than the held time, the process advances to step S1208, and the NW electricity saving shift timer 1101 determines whether the conditions for shifting to the normal power state are satisfied. If the shift conditions are not satisfied, the process returns to step S1206. If the shift conditions are satisfied, the process advances to step S1209, and the NW electricity saving shift timer 1101 causes the power supply control unit 704 to control the power supply 112 so as to shift to a power supply state in the normal power state, and terminates the process.

On the other hand, if it is determined in step S1205 that the EEE is disabled, the process advances to step S1210, and the NW electricity saving shift timer 1101 sets, in the PHY communication rate setting unit 703, a low communication rate at which the power consumption of the PHY 103 is minimum. Note that in step S1210, the communication rate of the PHY 103 is set at a maximum of 10 Mbps. After that, the PHY 103 executes negotiation and establishes a LAN network link by the new settings. Subsequently, the process advances to step S1211, and whether the conditions for shifting to the normal power state are satisfied is determined in the same manner as in step S1208. If the shift conditions are not satisfied, the process returns to step S1211. However, if it is determined by, for example, notification from the job reception confirmation unit 701 that the shift conditions are satisfied, the process advances to step S1212. In step S1212, the NW electricity saving shift timer 1101 causes the PHY communication rate setting unit 703 to set the communication rate of the PHY 103 at the highest communication rate within a possible range. Note that in step S1212, the communication rate of the PHY 103 is set at a maximum of 1,000 Mbps. After that, the PHY 103 executes negotiation, establishes a link by the new settings, and advances the process to step S1209.

In the third embodiment as explained above, when the EEE function is enabled, the communication rate of the PHY is not changed. As a consequence, the power consumption can be reduced while both of the two connected apparatuses are using the LPI, and packet dropping is prevented. Also, if the EEE function is disabled, the communication rate of the PHY is set at a low communication rate at which the power consumption of the network is minimized. This can effectively maximize the electricity saving effect. Furthermore, even when the EEE function is enabled, the communication rate of the PHY at which a time elapsed after a shift to the power saving state is a predetermined time is set at a low communication rate at which the network power consumption is minimum. This can effectively enhance the electricity saving effect.

Fourth Embodiment

The fourth embodiment of the present invention will be explained below. Note that the arrangement of an information processing apparatus 100 according to the fourth embodiment and the connection form of the information processing apparatus 100 are the same as those of the above-described first embodiment, so an explanation thereof will be omitted. In the fourth embodiment, an example in which the user sets control of a PHY 103 when shifting to the power saving state will be explained.

Figure 13:
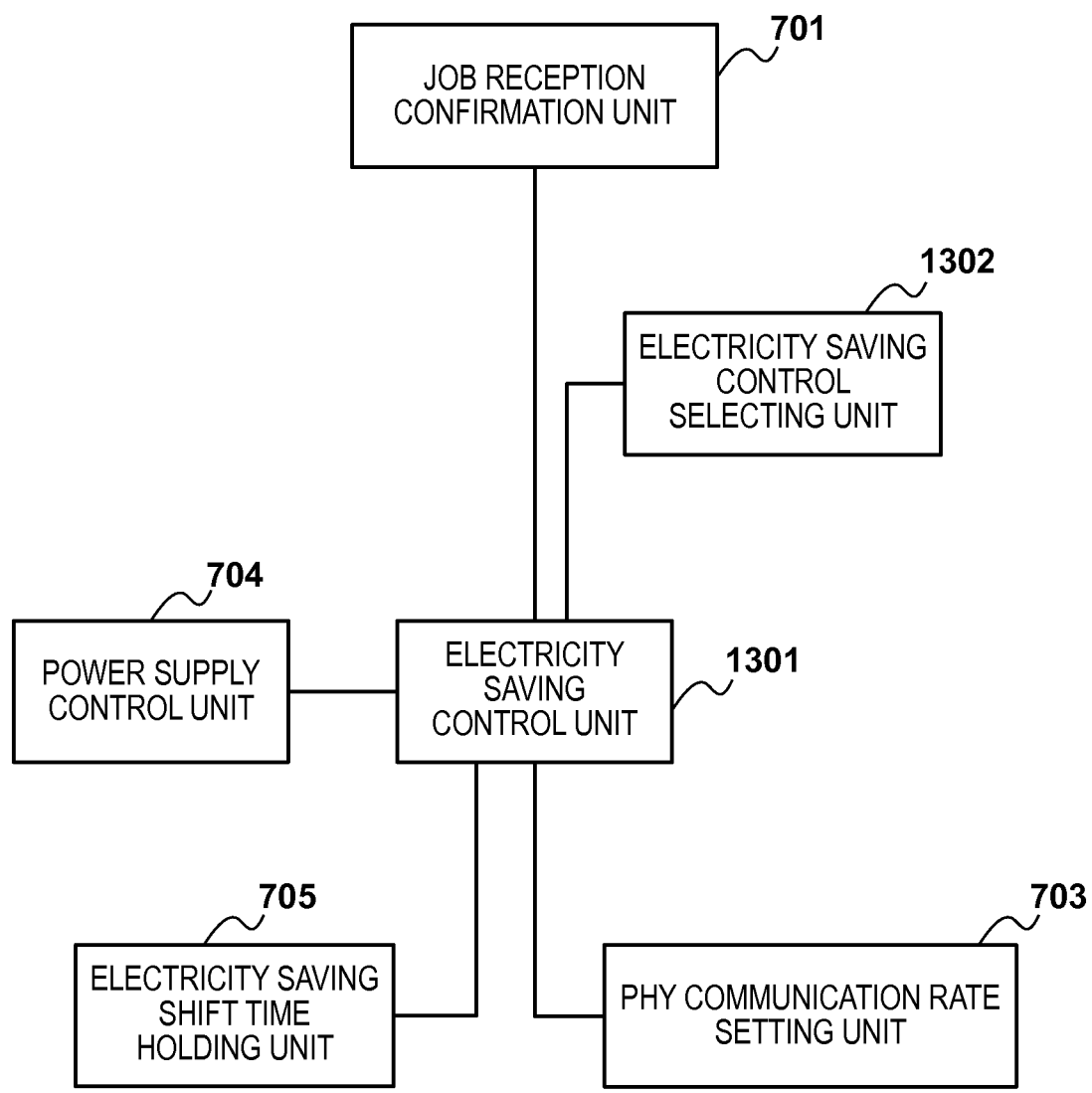
FIG. 13 is a view for explaining the configuration of software to be executed by a CPU of an information processing apparatus according to the fourth embodiment.

FIG. 13 is a view for explaining the configuration of software to be executed by a CPU 108 of the information processing apparatus 100 according to the fourth embodiment of the present invention. Note that the same reference numerals as in FIG. 7 of the first embodiment denote the same parts in FIG. 13, and an explanation thereof will be omitted.

An electricity saving control unit 1301 measures a time during which the information processing apparatus 100 has not received an electricity saving cancellation packet and an operation panel 114 has not been operated in succession. An electricity saving control selecting unit 1302 notifies the electricity saving control unit 1301 of a communication rate to be set in the PHY 103 when the information processing apparatus 100 shifts to the power saving state. The user can set an arbitrary value by operating the operation panel 114, as the communication rate of the PHY 103 to be set in the electricity saving control selecting unit 1302. When shifting to the power saving state, the electricity saving control unit 1301 sets setting contents notified from the electricity saving control selecting unit 1302 in a PHY communication rate setting unit 703. Note that the user can change the settings in the electricity saving control selecting unit 1302 at an arbitrary timing after the information processing apparatus 100 is activated.

After the information processing apparatus 100 is activated, the electricity saving control unit 1301 starts time measurement. If an electricity saving cancellation packet is received or an operation is accepted from the operation panel 114 in the normal power state, a job reception confirmation unit 701 notifies the electricity saving control unit 1301 of this information. If the electricity saving control unit 1301 receives the notification from the job reception confirmation unit 701 after the time measurement is started and before a time held in an electricity saving shift time holding unit 705 is reached, the electricity saving control unit 1301 clears the time measured up to the point to 0. If the electricity saving control unit 1301 does not receive any notification from the job reception confirmation unit 701 after the time measurement is started and before the time held in the electricity saving shift time holding unit 705 is reached, the electricity saving control unit 1301 instructs a power supply control unit 704 to shift to the power saving state.

By performing control as described above, the user can select the communication rate of the PHY 103 when shifting to the power saving state. When shifting to the power saving state, therefore, the user can select whether to give priority to the reduction of the power consumption of the information processing apparatus 100 or to the prevention of link disconnection of the LAN network.

Figure 14:
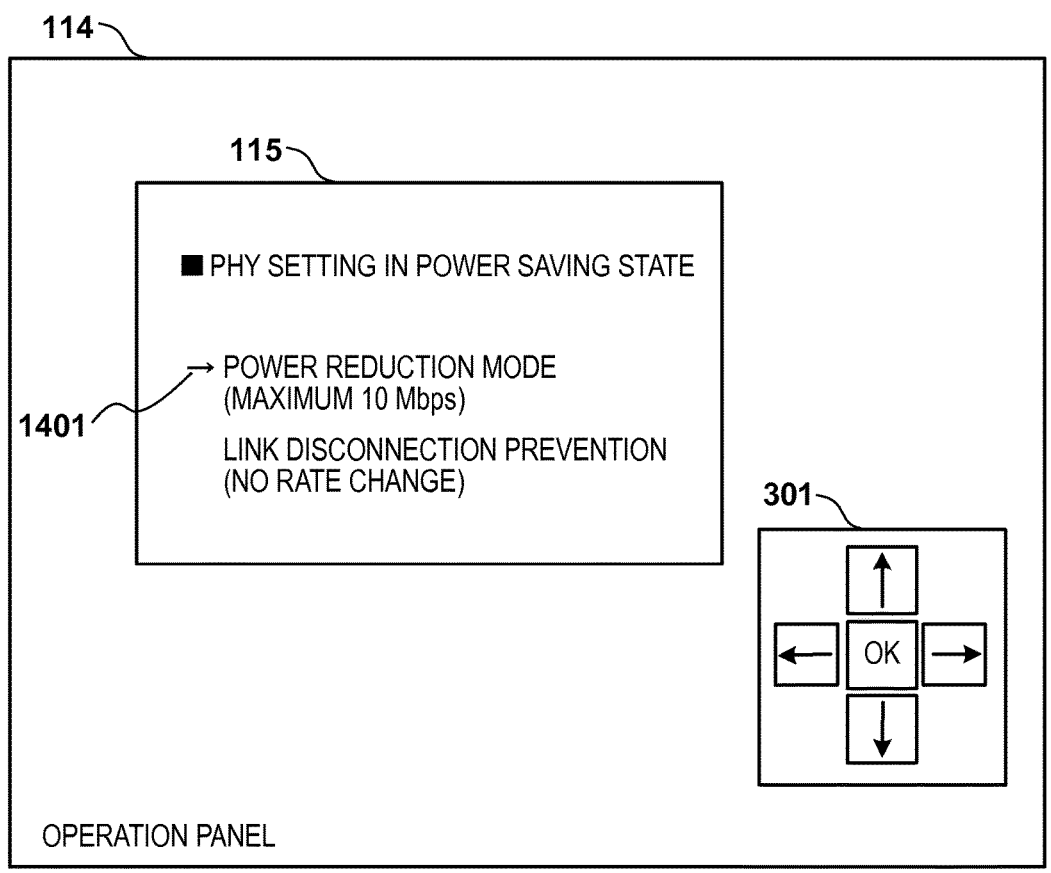
FIG. 14 is a view showing an example of an operation screen for setting whether to give priority to power reduction or link disconnection prevention, when the information processing apparatus according to the fourth embodiment shifts to a power saving state.

FIG. 14 is a view showing an example of an operation screen for setting whether to give priority to power reduction or link disconnection prevention when shifting to the power saving state in the information processing apparatus according to the fourth embodiment.

A display unit 115 of the operation panel 114 can display a command received by the operation panel 114 from the CPU 108. When a touch panel is used as the display unit 115, the user can also execute a command by directly touching the display unit 115. The user selects and decides displayed contents by operating a select button 301. When the user intends to perform power reduction in the power saving state, he or she selects "POWER REDUCTION MODE" by moving a cursor 1401 by using arrow buttons of the select button 301, and presses an "OK" button. Consequently, the communication rate of the PHY 103 can be set at a rate (in the fourth embodiment, a maximum of 10 Mbps) at which the power consumption is minimum.

On the other hand, when giving priority to link disconnection prevention, the user selects "LINK DISCONNECTION PREVENTION" by moving the cursor 1401 by using the arrow buttons of the select button 301, and presses the "OK" button. Consequently, link disconnection prevention of the PHY 103 can be given priority without changing the communication rate of the PHY 103.

Figure 15:
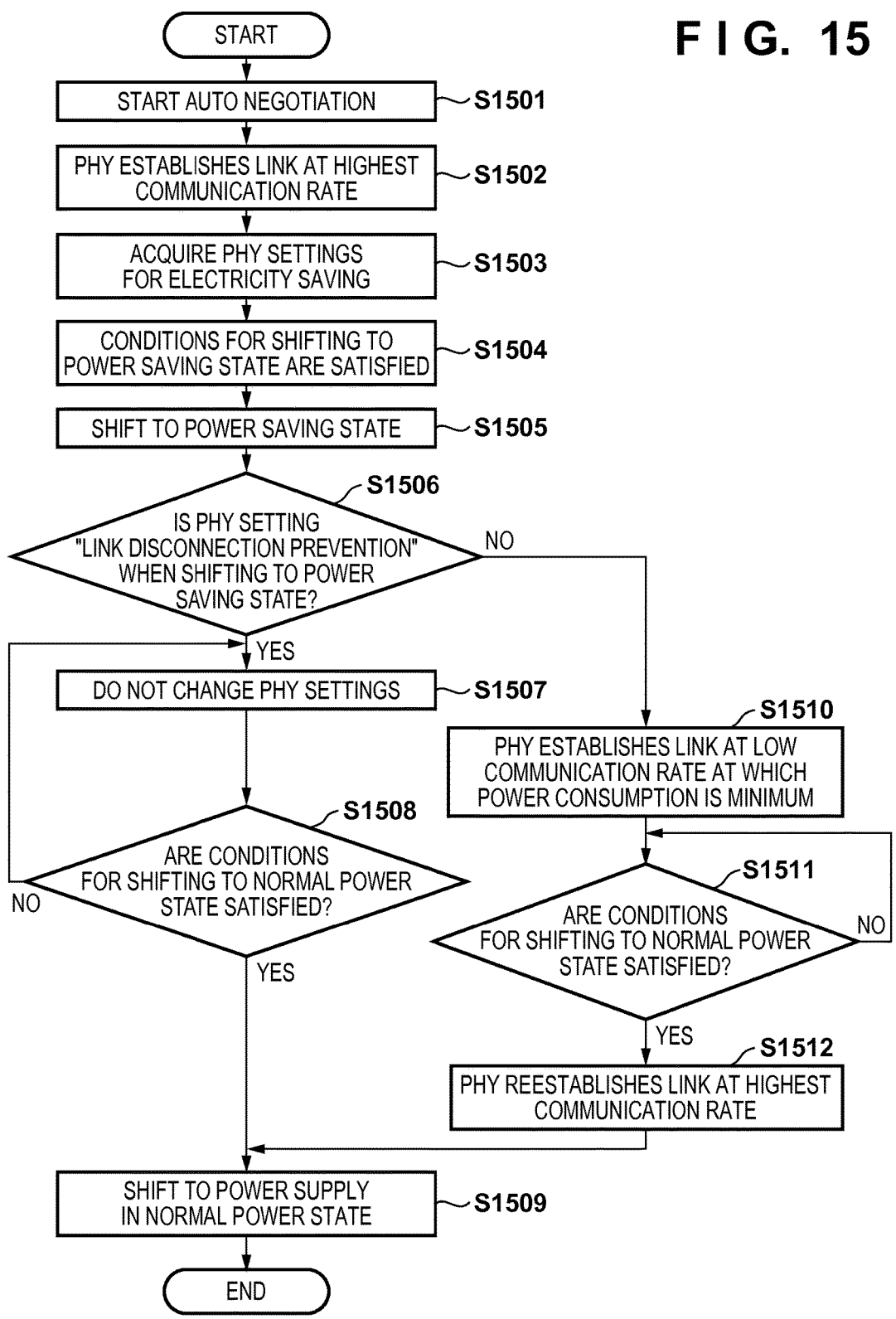
FIG. 15 is a flowchart for explaining a process of setting the communication rate of a PHY in the power saving state performed by the information processing apparatus according to the fourth embodiment.

FIG. 15 is a flowchart for explaining the PHY communication rate setting process in the electricity saving state performed by the information processing apparatus 100 according to the fourth embodiment. Note that a program for executing this process is stored in a ROM 116, and executed under the control of the CPU 108 after being loaded in a RAM 109. Note that the CPU 108 executes individual steps in the following flowchart, but these steps will be explained as processing executed by the units shown in the software configuration of FIG. 13.

This process is started when the information processing apparatus 100 is powered on. Note that processes in steps S1501 and S1502 of FIG. 15 are the same as those in steps S801 and S802 of FIG. 8 of the above-described first embodiment, so an explanation thereof will be omitted.

In step S1503, the electricity saving control unit 1301 sets contents selected on the operation screen shown in FIG. 14 in the electricity saving control selecting unit 1302. In the fourth embodiment, when "POWER REDUCTION MODE" is selected, the communication rate of the PHY 103 is set at a maximum of 10 Mbps. When "LINK DISCONNECTION PREVENTION" is selected, the communication rate of the PHY 103 is set at a maximum of 1,000 Mbps.

In step S1504, the electricity saving control unit 1301 determines whether there is notification from the job reception confirmation unit 701 during the period set in the electricity saving shift time holding unit 705. If there is no notification in this period, the electricity saving control unit 1301 determines that the conditions for shifting to the power saving state are satisfied. Then, in step S1505, the electricity saving control unit 1301 instructs the power supply control unit 704 to shift to the power saving state. Accordingly, the power supply control unit 704 shifts to the power saving state as shown in FIG. 6C by controlling a power supply 112.

Subsequently, the process advances to step S1506, and the electricity saving control unit 1301 determines whether "LINK DISCONNECTION PREVENTION" is set by the electricity saving control selecting unit 1302, that is, whether the communication rate of the PHY 103 is not changed when shifting to the power saving state. If so, the process advances to step S1507, and the electricity saving control unit 1301 continues the LAN network link and communication without changing the communication rate of the PHY 103. Accordingly, the communication rate of the PHY 103 is kept at a maximum of 1,000 Mbps. After that, the process advances to step S1508, and the electricity saving control unit 1301 determines whether the conditions for shifting to the normal power state are satisfied. If it is determined that the shift conditions are satisfied, the process advances step S1509, and the electricity saving control unit 1301 causes the power supply control unit 704 to shift to a power supply state in the normal power state, and terminates the process.

On the other hand, if the electricity saving control unit 1301 determines in step S1506 that "POWER REDUCTION MODE" is selected, the process advances to step S1510, and the electricity saving control unit 1301 sets, in the PHY communication rate setting unit 703, a low communication rate at which the power consumption of the PHY 103 is minimum. Note that in step S1510, the communication rate of the PHY 103 is set at a maximum of 10 Mbps. After that, the PHY 103 executes negotiation and establishes a LAN network link by the new settings. Subsequently, the process advances to step S1511, and the electricity saving control unit 1301 determines whether the conditions for shifting to the normal power state are satisfied, in the same manner as in step S1508. If it is determined that the shift conditions are satisfied, the process advances to step S1512, and the electricity saving control unit 1301 causes the PHY communication rate setting unit 703 to set the communication rate of the PHY 103 at the highest communication rate within a possible range. Note that in step S1512, the communication rate of the PHY 103 is set at a maximum of 1,000 Mbps. After that, the PHY 103 executes negotiation, establishes a link by the new settings, and advances the process to step S1509. In step S1509, the electricity saving control unit 1301 causes the power supply control unit 704 to shift to the power supply state in the normal power state, and terminates the process.

As has been explained above, the operation to be performed based on whether the EEE is enabled or disabled has been explained in the embodiment. However, the present invention is also applicable when both of two connected apparatuses have a function of reducing the power of a communication unit when LAN traffics are few.

In the fourth embodiment as explained above, when shifting to the power saving state, the user can set whether to give priority to the process of reducing the power consumption by changing the communication rate of the PHY, or to the process of preventing disconnection of the link of the PHY. When giving priority to the prevention of link disconnection, therefore, the communication rate of the PHY is not changed when shifting to the power saving state. Accordingly, the power consumption can be reduced while both of the two connected apparatuses are using the LPI, and packet dropping is prevented.

Also, when giving priority to the reduction of the power consumption, the communication rate of the PHY is set at a low communication rate at which the power consumption is minimized, when shifting to the power saving state. This can effectively maximize the electricity saving effect.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-052429, filed Mar. 14, 2014, which is hereby incorporated by reference herein in its entirety.

What is claimed is:

1. A printing apparatus having an EEE (Energy Efficient Ethernet) function, comprising:
   a printer;
   a memory;
   a processor;
   a determining unit configured to determine whether or not the EEE function is enabled;
   a detecting unit configured to detect that a shift condition for the printing apparatus shifting from a first power state in which power is supplied to the printer to a second power state in which power is not supplied to the printer is satisfied, wherein a communication rate in the first power state is a predetermined communication rate and the predetermined communication rate is higher than 100 Mbps; and a changing unit configured to change, in a case where the detecting unit detects that the shift condition is satisfied and it is determined by the determining unit that the EEE function is not enabled, a communication rate of the printing apparatus in the second power state from the predetermined communication rate to 10 Mbps, and change, in a case where the detecting unit detects that the shift condition is satisfied and it is determined by the determining unit that the EEE function is enabled, the communication rate of the printing apparatus in the second power state from the predetermined communication rate to 100 Mbps, wherein the determining unit, the detecting unit and the changing unit are implemented by the processor executing at least one program recorded on the memory.

2. The apparatus according to claim 1, wherein the predetermined communication rate is 1000 Mbps.

3. The apparatus according to claim 1, wherein the determining unit is configured to, when the detecting unit detects that the shift condition is satisfied, determine whether or not the EEE function is enabled.

4. A method of controlling a printing apparatus having an EEE (Energy Efficient Ethernet) function, the method comprising:

determining whether or not the EEE function is enabled;

detecting that a shift condition for the printing apparatus shifting from a first power state in which power is supplied to the printer to a second power state in which power is not supplied to the printer is satisfied, wherein a communication rate in the first power state is a predetermined communication rate and the predetermined communication rate is higher than 100 Mbps; and changing, in a case where the detecting detects that the shift condition is satisfied and it is determined by the determining that the EEE function is not enabled, a communication rate of the printing apparatus in the second power state from the predetermined communication rate to 10 Mbps, and changing, in a case where the detecting detects that the shift condition is satisfied and it is determined by the determining that the EEE function is enabled, the communication rate of the printing apparatus in the second power state from the predetermined communication rate to 100 Mbps.

5. A non-transitory computer-readable storage medium storing a program for causing a computer to execute a method of controlling a printing apparatus having an EEE (Energy Efficient Ethernet) function, the method comprising:

determining whether or not the EEE function is enabled;

detecting that a shift condition for the printing apparatus shifting from a first power state in which power is supplied to the printer to a second power state in which power is not supplied to the printer is satisfied, wherein a communication rate in the first power state is a predetermined communication rate and the predetermined communication rate is higher than 100 Mbps; and changing, in a case where the detecting detects that the shift condition is satisfied and it is determined by the determining that the EEE function is not enabled, a communication rate of the printing apparatus in the second power state from the predetermined communication rate to 10 Mbps, and changing, in a case where the detecting detects that the shift condition is satisfied and it is determined by the determining that the EEE function is enabled, the communication rate of the printing apparatus in the second power state from the predetermined communication rate to 100 Mbps.

\* \* \* \* \*